SHIFTING REGISTER AND STORAGE DEVICE THEREFOR

Filed March 5, 1953 9 Sheets-Sheet 1

INVENTOR.
DAVID J. CRAWFORD

BY Joseph C. Sweet, Jr

ATTORNEY

WAVE FORMS FOR "ONE" INPUT
FIG.4
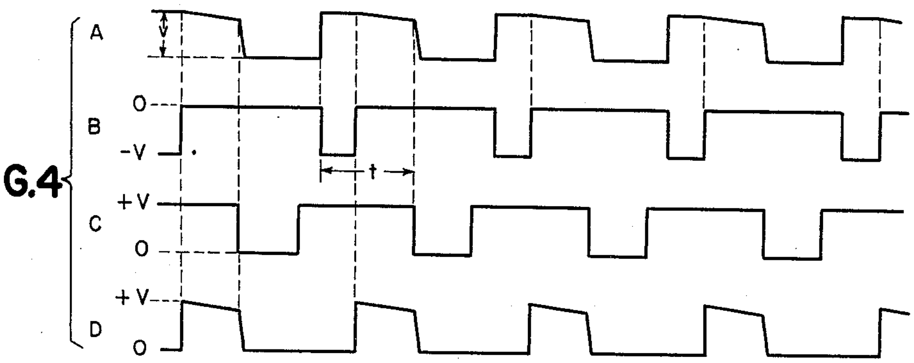
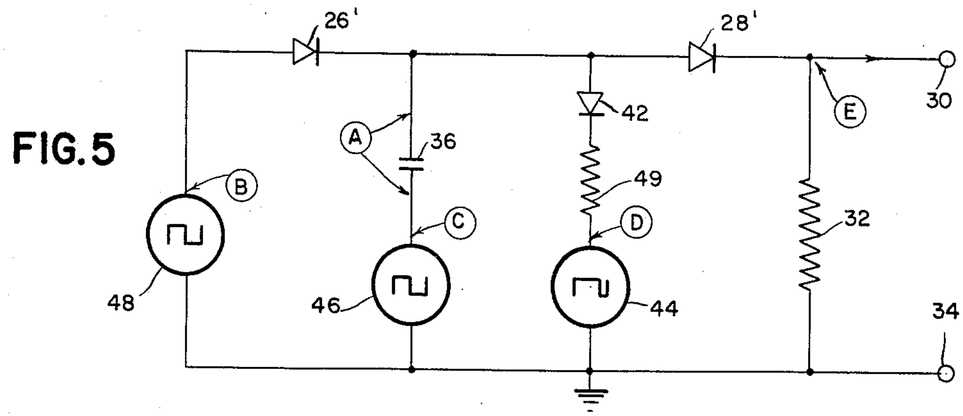
FIG. 6
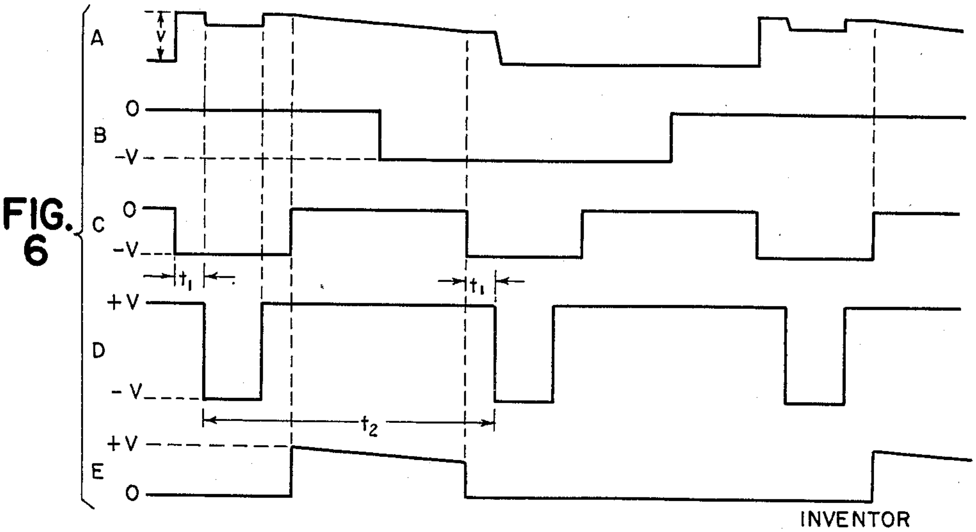
INVENTOR
DAVID J. CRAWFORD
BY Joseph C. Sweet, Jr.
ATTORNEY INVENTOR.
DAVID J. CRAWFORD
BY
Joseph C. Sweet, Jr.
ATTORNEY

INVENTOR.
DAVID J. CRAWFORD

BY Joseph C. Sweet, Jr.

ATTORNEY

Jan. 26, 1960 D. J. CRAWFORD 2,922,985

SHIFTING REGISTER AND STORAGE DEVICE THEREFOR

Filed March 5, 1953 9 Sheets-Sheet 5

INVENTOR.
DAVID J. CRAWFORD

BY Joseph C. Sweet, Jr.

ATTORNEY

INVENTOR.
DAVID J. CRAWFORD
BY Joseph C. Sweet, Jr.
ATTORNEY

INVENTOR.
DAVID J. CRAWFORD
BY Joseph C. Sweet, Jr.
ATTORNEY

INVENTOR.
DAVID J. CRAWFORD
BY
Joseph C. Sweet, Jr.
ATTORNEY

Jan. 26, 1960 D. J. CRAWFORD 2,922,985

SHIFTING REGISTER AND STORAGE DEVICE THEREFOR

Filed March 5, 1953

9 Sheets-Sheet 9

INVENTOR.
DAVID J. CRAWFORD

BY Joseph C. Sweet, Jr.

ATTORNEY

United States Patent Office
2,922,985
Patented Jan. 26, 1960

2,922,985

SHIFTING REGISTER AND STORAGE DEVICE THEREFOR

David J. Crawford, Poughkeepsie, N.Y., assignor to International Business Machines Corporation, New York, N.Y., a corporation of New York Application March 5, 1953, Serial No. 340,503

30 Claims. (Cl. 340—173)

This invention relates to shifting registers and more particularly to shifting registers utilizing a new and novel type of storage device.

A shifting or stepping register is one which can receive a set of digits in time sequence (serially) or simultaneously (in parallel), hold the digits indefinitely, and move the digits along in response to a signal. Preferably, this movement should be possible in either direction, i.e., to the left or right from each stage to the adjacent stages. In general, in the description which follows such a shifting register, which has particular utility in electronic computers of digital information, will be described with reference to its use in a system using the binary system of notation, i.e., any informational quantity treated may have either of two values, commonly referred to as "0" ("zero") and "1" ("one").

One feature of this invention is the provision of a new and novel type of a storage device, preferably including a condenser, one or more of these storage devices being utilized in each stage of the register.

Another feature of this invention is the provision of such a storage device in which the condenser is regeneratively charged after being discharged.

Another feature of this invention is the provision of such a storage device in which the D.C. level of the output is different from that of the input.

Still another feature of this invention is the provision of such a storage device which furnishes "current amplification," i.e., its input may be of small current value, received at a slow rate, whereas its output is short and provides a large amount of current.

A further feature of this invention is the provision of a storage device including a condenser having one terminal thereof connected to the junction of a pair of serially-connected diodes and its other terminal connected to a source of varying potential, preferably a pulse generator, for charging the condenser through one diode and discharging it through the other diode.

A still further feature of this invention is the provision of a storage device employing a reactive energy storage device other than a condenser, e.g., an inductance or a pulse-forming network.

Basically, a register in accordance with this invention is operated by entering its contents into one or more of these storage devices and then discharging the storage devices into desired positions in the register. In one embodiment the register is cleared as an intermediate step, but in another embodiment dual outputs and storage devices are provided for each stage of the register to eliminate the need for the clearing operation.

Accordingly, another feature of this invention is the provision of such a shifting register wherein the clearing operation is eliminated.

Another feature of this invention is the provision of a shifting register including a bi-stable trigger circuit and at least one new and novel storage device in accordance with this invention in each stage.

Still another feature of this invention is the provision of such a shifting register including a plurality of gate or "AND" circuits in each stage for routing incoming signals properly either to recirculate information within a stage or shift information to the next stage to the right or left.

A further feature of this invention is the provision of a shifting register including a bi-stable trigger circuit and a plurality of storage devices in accordance with this invention for each stage, these storage devices being selectively operable simultaneously with corresponding devices of each other stage to store or not store energy information in order to shift such information subsequently to the next stage to the right or left or read it out of the register.

A still further feature of this invention is the provision of a ring-connected shifting register which can be operated as a commutator.

Other features of the invention will be pointed out in the following description and claims and illustrated in the accompanying drawings which disclose, by way of example, the principle of the invention and the best modes which have been contemplated of applying that principle.

In the drawings:

Figs. 3 and 5 illustrate, in circuit diagram form, further modifications of the storage device of this invention;

Figs. 4 and 6 show waveforms useful in the explanation of the operation of the circuits of Figs. 3 and 5, respectively;

Figure 1:
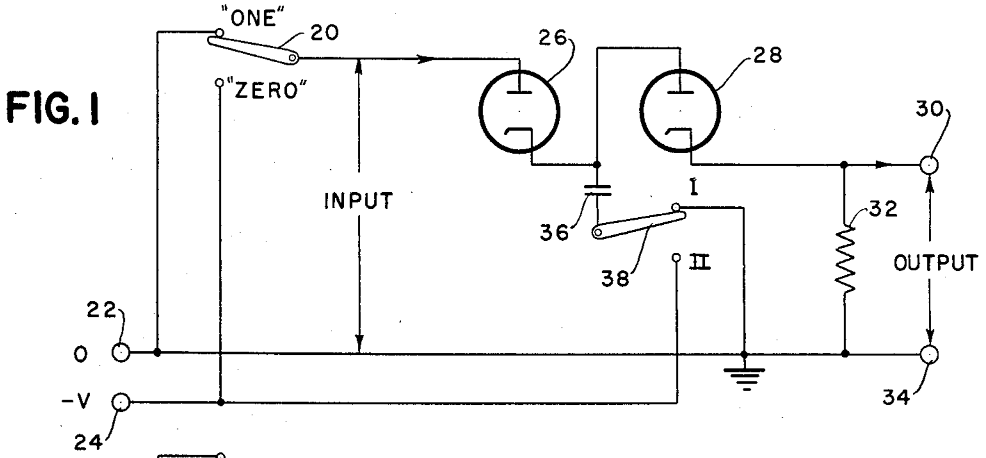
Fig. 1 is a circuit diagram useful in explaining the principle of operation of the storage device.

Referring now to Fig. 1, switch 20 represents an input signal source. When in its upper position, i.e., connected to the grounded or zero-potential terminal 22, it may be considered as representing a "one" in binary notation. When in its lower position, i.e., connected to terminal 24 to which is applied a negative potential "—V", it may be considered as representing a "zero" in binary notation. The common or blade connection of switch 20 is connected to the anode or plate of diode 26, the cathode of this diode is connected to the plate of diode 28, and the cathode of this latter diode is connected to output terminal 30. Load impedance 32 is connected between output terminals 30 and 34, the latter of which is also grounded. The upper terminal of condenser 36 is connected to the junction of diodes 26 and 28, and its lower terminal is connected to the blade or common terminal of a second switch 38. In its upper or "I" position, switch 38 thus connects the lower terminal of condenser 36 to ground and zero potential terminal 22. In its lower or "II" position, switch 38 connects the lower terminal of condenser 36 to the —V potential terminal 24.

Figure 2:
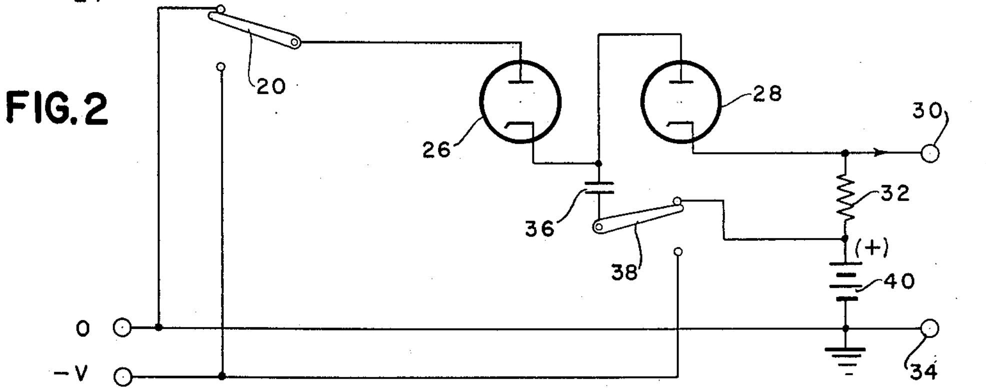
Fig. 2 is a modified form of the circuit of Fig. 1.

For illustrative purposes element 38 has been shown diagrammatically as a switch in Figs. 1 and 2. However, in a practical embodiment this element will be in the form of a pulse generator, as shown in Figs. 3 and 5.

Figure 3:
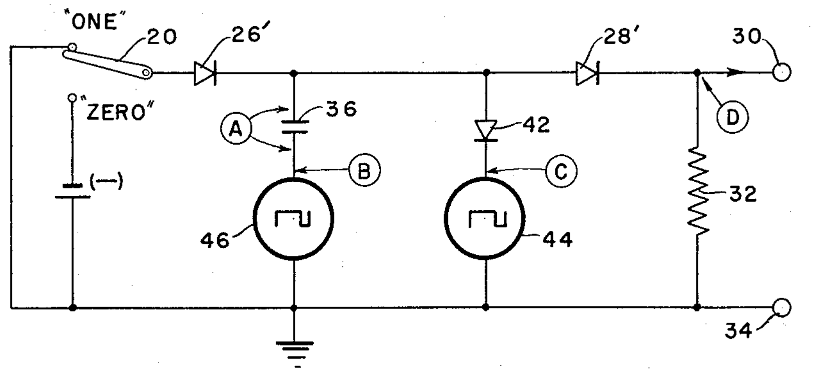

Further, while in the storage circuits of Figs. 1–3 the input has been shown diagrammatically as a switch connected to two different voltage levels, it will also be apparent to those skilled in the art that this is again merely illustrative, and that the invention is applicable to any input source providing differing voltage levels, e.g., another pulse generator as shown in Fig. 5, a trigger circuit, an amplifier, etc. Also, while load resistor 32 is included in Fig. 1 and certain of the other figures, it may be omitted if desired when a load impedance is connected between terminals 30 and 34.

Referring now to the operation of the circuit of Fig. 1, assume initially that both switches 20 and 38 are in their upper positions as shown. No current then flows in the circuit. However, if switch 38 is now moved to position II, a circuit will be completed from terminal 22 through switch 20, diode 26, condenser 36 and switch 38 to —V terminal 24, thus charging condenser 36. Switch 20 may now be moved to a neutral position or to its lower position with no effect upon the charge on condenser 36 due to the presence of diode 26 in the circuit. The length of time that the charge remains on condenser 36 will be determined by the leakage of this condenser and also any other stray leakage in the circuit, such as the leakage of diodes 26 and 28. However, as a practical matter, this is a relatively long time, e.g., a charge may be stored on a 0.01 mfd. standard mica condenser for many hours.

It should be noted at this point that no current yet flows through resistor 32 or diode 28, regardless of the position of switch 20, inasmuch as terminals 22 and 24 are at and below, respectively, the potential of terminal 34, and condenser 36, even though charged, is not yet connected in circuit with diode 28 and resistor 32. Diode 28 is included in the circuit to prevent condenser 36 from charging through output or load resistor 32 when the lower terminal of the condenser is negative with respect to output terminals 30 and 34.

When it is desired to deliver the charge stored on condenser 36 to a load connected to output terminals 30 and 34, switch 38 is returned to position I. The voltage of condenser 36 is of the proper polarity to cause conduction through diode 28, poled as shown, and is now impressed across the forward resistance of diode 28 in series with load impedance 32 and the impedance of any load connected thereacross. This voltage will then decay exponentially as condenser 36 discharges.

Diode 26 serves two functions. It isolates the upper terminal of condenser 36 from the input and thus prevents the discharge of this condenser, when charged, if the input voltage level thereafter falls, as well as allowing the upper terminal to be raised above the voltage level of the input when it is desired to discharge the condenser through the load. It also prevents the condenser, when discharged, from being charged if the voltage level of the input falls below the voltage level of the lower terminal of the condenser.

Thus, had switch 20 been in its lower position, i.e., representing the binary digit "zero," condenser 36 would have never received a charge because diode 26 then blocks conduction when switch 38 is in its upper position I and, in the lower position II of switch 38, no potential difference is established across the condenser.

As pointed out previously, if desired the D.C. level of the signal may be shifted, as illustrated in the circuit of Fig. 2. In Fig. 1 the magnitude of the output was substantially the peak-to-peak value of the input voltage V, this output being positive above the reference ground or zero potential of terminal 34. However, if load impedance 32 is connected in series with a potential source 40 between output terminals 30 and 34, as shown in Fig. 2, and the upper terminal of switch 38 is connected to the junction of resistor 32 and source 40, the output signal of magnitude V will be superimposed on the potential provided by potential source 40. With the polarities shown in Fig. 2, the output pulse will be added to the potential of battery 40.

Thus it is seen that when one is dealing with positive-going signals the output signal will be at a more positive level than the input signal. If it is desired to store and deliver less than the full input signal swing, then the base line of the output can be biased above the most positive level of the input signal (but less than the input signal voltage swing), e.g., by inserting a small battery in series with resistor 32 between terminals 30 and 34, poled as shown in Fig. 2. Another way is to reduce the voltage swing of the lower terminal of condenser 36 to less than the voltage swing of the input signal.

If it is desired to store and deliver the full input signal swing, then the base line of the output signal cannot be below the most positive level of the input signal and the voltage swing of the lower terminal of condenser 36 must be equal to the voltage swing of the input signal plus any biasing potential of the output. However, the load may be biased as positively as desired providing the driving signal has the appropriate voltage swing, as shown in Fig. 2. For the poling of the diodes shown in Figs. 1 and 2 and positive-going inputs, the most positive voltage level of the input should never exceed the reference potential level of the output to avoid any voltage change thereat during the time the condenser 36 is being charged. In other words in Fig. 1 the upper voltage level of the input should not exceed zero volts, and in Fig. 2 it should not exceed the positive potential of source 40.

For diodes poled reversely from the showing of Figs. 1 and 2 and negative-going inputs, the most negative voltage level of the input should never fall below the reference voltage level of the output for the same reasons.

As will be apparent to those skilled in the art, the D.C. levels of the upper and lower values of the voltage swing at the lower terminal of condenser 36 do not affect the operation of the circuit so long as the magnitude of the voltage swing is appropriate. The only effect would be to provide a residual charge upon the condenser. In other words, if the lower terminal of condenser 36 were driven between −100 and −(100+V) volts (instead of zero and −V as shown in Fig. 1) a residual potential of 100 volts would remain on this condenser when it was discharged through the load.

The explanation given thus far and the circuits shown in Figs. 1 and 2 have applied to the case where positive signals or input signals are utilized. By reversing the polarity of diodes 26 and 28 and that of the driving signal, negative-going inputs may be utilized to provide negative-going outputs. In this case, the output signal always has to be at a lower voltage level than the input signal.

It will be recalled that the output signal from the circuits of Figs. 1 and 2 is exponential in nature due to the discharge of condenser 36. In some instances it may be that the effective output impedance, i.e., the impedance of the driven load and the paralleled impedance of output impedance 32, if used, may be so high or variable in nature that the resultant decay of the output signal does not have a desirable waveform. In this case, the circuit shown in Fig. 3 may be utilized. Here a third diode 42 is connected in series with a pulse generator 44, and this series network connected in parallel with the series network comprising condenser 36 and pulse generator 46, which replaces the diagrammatic switch 38 of Figs. 1 and 2 and provides the driving signal or pulse. In Fig. 3, diode 42 is shown as being of the semi-conductor (e.g., selenium, silicon or germanium) type, and diodes 26' and 28' of the same type have been shown as replacing diodes 26 and 28 of Figs. 1 and 2. The poling of these diodes is again shown for a positive-going input.

The waveforms shown in lines A—D of Fig. 4 are useful in explaining the operation of the circuit of Fig. 3, and the points in the circuit of Fig. 3 at which these waveforms appear have been indicated by encircled letters corresponding to the respectively lettered lines of Fig. 4.

Assume initially that switch 20 of Fig. 3 is in its upper or grounded position, which it will be recalled represents a binary "one" digit input. Generator 46 (Fig. 3) produces a series of regularly-recurring negative pulses of magnitude V, its reference output voltage level being at ground potential as shown in line B of Fig. 4. With switch 20 in its upper position, as shown in Fig. 3, condenser 36 will charge to produce a potential V across its terminals whenever pulse generator 46 produces a negative output. Thus, as shown initially in line A of Fig. 4, the voltage across condenser 36 is at its maximum value V. When the output of pulse generator 46 thereafter returns to its zero reference potential, condenser 36 will, as shown in line A, start to discharge exponentially through diode 28' and the paralleled impedances of resistor 32 and the load connected between output terminals 30 and 34 of Fig. 3. It will be noted, however, that this decay is quite slow since it has been assumed that the paralleled impedance of resistor 32 and the load impedance is quite high.

The output of pulse generator 44 is synchronized with the output of pulse generator 46 of Fig. 3 and comprises another series of regularly-recurring negative pulses each occurring at a time "$t$" after a corresponding pulse output from generator 46. Note from line C of Fig. 4 that while the magnitude of the output pulses from generator 44 is also equal to "V," the reference output voltage level of this generator is at "+V." As long as the output of generator 44 is at this positive reference voltage level, diode 42 cannot conduct. However, when its negative pulse output occurs and drops the potential of the cathode or base of diode 42 to ground, the latter conducts and discharges condenser 36 rapidly, thus terminating the resultant output pulse as shown in line D of Fig. 4.

If desired, a limiting resistor 49 may be inserted in series with diode 42 and pulse generator 44, as shown in Fig. 5. Further, the timing of the output of pulse generator 44 may be varied from that shown in Fig. 4, as illustrated by the waveforms of Fig. 6, so as to tend to discharge condenser 36 during the time when it would normally be charged due to the combined action of the input source (now represented by a third pulse generator 48) and pulse generator 46. When the input is now at its higher voltage level simultaneously with a negative pulse output from pulse generator 44, the input must be able to supply current to pulse generator 46 as well as the charging current for condenser 36. However, if the input is at its lower voltage level when a pulse output from pulse generator 44 occurs, the latter serves to eliminate any charge which might possibly remain on condenser 36 from the previous cycle.

The waveforms for this operation of the circuit of Fig. 5 are shown in lines A—E of Fig. 6. The points at which these waveforms appear in the circuit diagram of Fig. 5 are again indicated by corresponding and encircled letters. The voltage appearing across condenser 36 is shown in line A of Fig. 6, and the input from pulse generator 48 (Fig. 5) is shown in line B and varies between voltage levels of zero and —V. Assume that initially the output of input pulse generator 48 is at its upper voltage level, i.e., at zero, and that the output of pulse generator 46 is then at its reference voltage level, i.e., also zero.

Condenser 36 will then remain uncharged until the first negative output pulse from pulse generator 46 (line C of Fig. 6) reduces the potential of the lower terminal of condenser 36 to —V, at which time condenser 36 will charge to a potential "V." As in Fig. 3, the operation of pulse generator 44 is again synchronized with the operation of pulse generator 46, and at time "$t_1$" after the beginning of the first output pulse from the latter, the output from pulse generator 44 drops from its reference level of +V down to a voltage level of —V, as shown in line D of Fig. 6. This causes a current to flow through both diodes 26' and 42 and may somewhat reduce the charge upon condenser 36 (Fig. 5) as shown in line A of Fig. 6. The extent of this reduction depends upon the relative values of the sum of the internal impedance of generator 46 and the forward resistance of diode 26' as compared to the sum of the forward resistance of diode 42 and the resistance of impedance 49.

However, this negative pulse output from generator 44 (line D of Fig. 6) terminates before the end of the output pulse from generator 46 (line C of Fig. 6), and condenser 36 then recharges to its full value as indicated in line A. When the negative pulse output from generator 46 thereafter terminates as shown in line C of Fig. 6, the lower terminal of condenser 36 is effectively fixed at ground potential and its upper terminal, connected to the junction of diodes 26' and 28', is at a potential of +V with respect to ground. Condenser 36 then begins discharging exponentially through diode 28' and the combined impedance of load resistor 32 and the impedance of any external load connected to output terminals 30 and 34 (Fig. 5). The resultant output pulse is shown in line E of Fig. 6 and the gradual discharge of condenser 36 in line A.

This output pulse and the discharge of condenser 36 continue until the next negative output pulse from generator 46 (line C of Fig. 6) again drops the potential of the lower terminal of condenser 36 to a value of —V with respect to ground, at which time conduction through diode 28' (Fig. 5) ceases. Note, however, that as shown in line A of Fig. 6, a residual charge remains on condenser 36. Shortly thereafter, at time $t_2$ after the first negative pulse output from generator 44, a second pulse output is produced therefrom as shown in line D, this pulse again occurring during the time when a negative pulse output is being produced from generator 46 (Fig. 5). Since it has been assumed that in the meantime the input from pulse generator 46 has been shifted to its lower value, i.e., —V, as shown in line B of Fig. 6, this negative pulse output from pulse generator 44 quickly discharges condenser 36 as shown in line A.

Note that as shown in line B, the input voltage level may now again rise to its upper of its two values at any time after the pulse output from generator 46 thereafter terminates without having any effect upon the charge condition of condenser 36. However, thereafter condenser 36 will, of course, charge to a value V when the next negative input pulse from generator 46 begins as shown in lines A and C, respectively, of Fig. 6.

The times at which the input from pulse generator 46 switches between its voltage levels have been arbitrarily indicated as shown in line B. However, the waveforms shown in lines A and C—E of Fig. 6 would remain substantially the same if the waveform of line B initially switched from its upper to its lower level at any time between the termination of the first output pulse from generator 44 (line D of Fig. 6) and the beginning of the second input pulse from pulse generator 46 (line C of Fig. 6). Similarly, these waveforms would remain the same if the waveform of line B thereafter switched from its lower level to its upper level at any time between the termination of the second output pulse from generator 46 and the beginning of the third output pulse therefrom (line C of Fig. 6).

Pulse generators 44 and 46, however, preferably each produce a series of regularly-recurring output pulses and, as pointed out previously, are preferably synchronized, as by means of a synchronizing line, so that each pulse output from generator 44 occurs during a pulse output from generator 46. Also each output pulse from generator 46 must be of slightly longer duration than the corresponding pulse output from generator 44 in order that condenser 36 may be charged if the input is at the upper one of its two voltage levels.

The upper or reference voltage level of the output of pulse generator 44 is at +V as shown in line D of Fig. 6 in order not to discharge condenser 36 while an output pulse is being produced at terminal 30. With the lower terminal of generator 44 grounded, as shown, the magnitude of the negative voltage swing of its output must then be 2V in order to reduce the potential of its upper terminal to −V when it is desired to discharge the condenser 36 and the lower terminal of the latter is also at a potential of −V. However, alternatively the lower terminal of generator 44 may be connected to the lower terminal of condenser 36. Then the magnitude of its negative voltage swing need only be equal to V and its output pulse will be superimposed on the output voltage level of generator 46, relative to ground potential.

Figure 7:
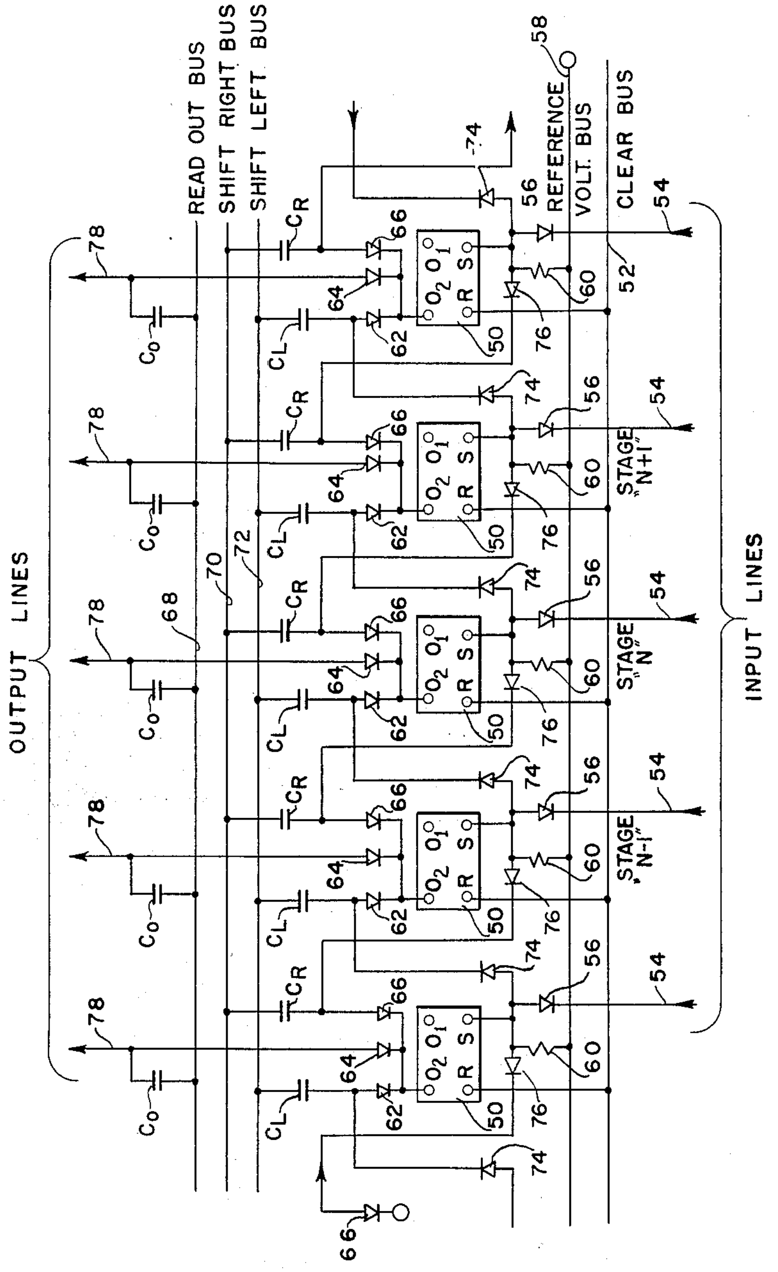
Fig. 7 illustrates, in combined circuit and block diagram form, a shifting register in accordance with this invention.

In Fig. 7 is shown in combined circuit and block diagram form five stages of a multi-stage shifting register in accordance with this invention. Each stage includes a bi-stable trigger circuit indicated by the block 50 and for which a suitable circuit utilizing vacuum tubes is shown in circuit diagram form in Fig. 9. Such a circuit commonly has two inputs and two outputs and the terminals of these are indicated in Fig. 7 by the small circles within each block 50.

One input, labeled "S," is utlized to "set" or trigger the circuit to its desired indicating condition and the other input, labeled "R," is utilized to reset the trigger circuit to its non-indicating condition. While two outputs, labeled "$O_1$" and "$O_2$," are shown within each block 50 of Fig. 7, only output $O_2$ is utilized in this particular embodiment. Each input terminal R is connected to reset or clear bus 52 and an individual input line 54 is connected to each input terminal S through a respective diode 56 poled as shown to pass only negative pulses. Each input terminal S is also connected to a common reference voltage bus 58 through a respective resistor 60.

The output from each terminal $O_2$ is applied to one terminal of each of three respective condensers labeled $C_o$, $C_L$ and $C_R$ through diodes 62, 64 and 66, respectively, again poled as shown to pass only negative pulses. The other terminal of each condenser $C_o$ is connected to common read-out bus 68, the other terminal of each condenser $C_R$ is connected to common shift right bus 70, and the other terminal of each condenser $C_L$ is connected to common shift left bus 72. These buses, as well as reset or clear bus 52 are normally maintained at the reference potential. The junction of each condenser $C_L$ and diode 62 of each stage is connected to input terminal S of the preceding stage through a respective diode 74, also poled to pass only negative pulses. Similarly, the junction of each condenser $C_R$ and its diode 66 of each stage is connected to input terminal S of the successive stage through a respective diode 76, also poled to pass only negative pulses. The junction of each condenser $C_o$ and its diode 64 is connected to a respective output line 78, which may be connected to any desired load, e.g., another similar register, providing the required series diode in its input line. A similar register does, of course, provide this diode (see diode 56 in each input line 54 of Fig. 7).

Figure 8:
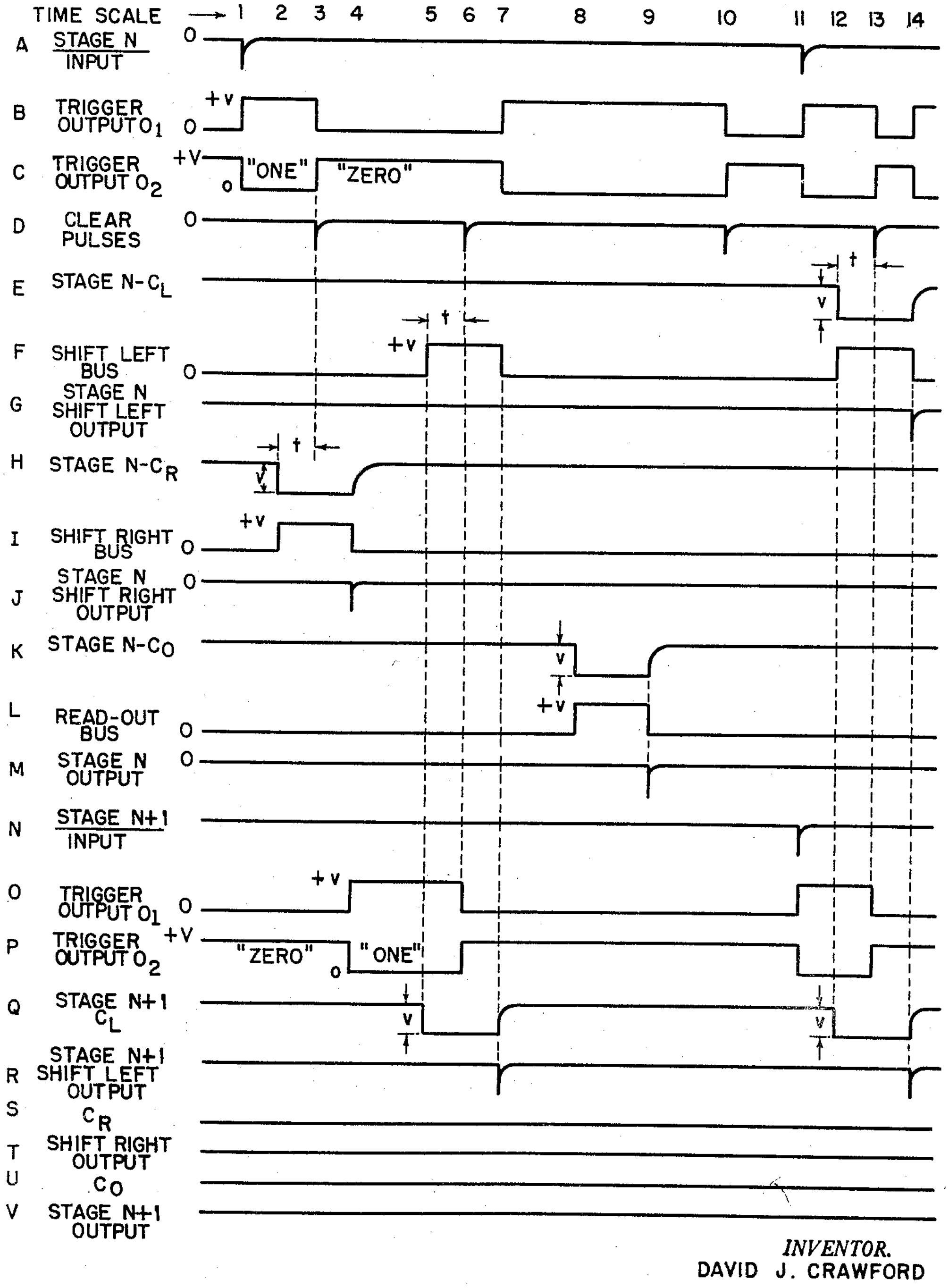
Fig. 8 shows waveforms useful in the explanation of the operation of the shifting register shown in Fig. 7.

Referring now to the third stage of Fig. 7, which has been labeled stage "N," and the fourth stage, which has been labeled "N+1," the operation of these circuits can be best explained by reference to the waveforms of Fig. 8. The time scale used in the explanation of the relative timing of the operation of these stages is shown at the top of Fig. 8. For illustrative purposes only, a reference voltage level of zero has been assumed.

Assume initially that each of the stages of Fig. 7 is in its reset condition, i.e., as shown in lines B and O of Fig. 8, output $O_1$ of each of the trigger circuits of stages N and N+1, respectively, is at the lower of its two values, i.e., "O." As shown in lines C and P of this figure, output $O_2$ of each of stages N and N+1, respectively, is then at the upper level of its two values, i.e., "+V." Assume now that at time 1 on the time scale a negative input pulse is applied via the respective input line 54 (Fig. 7) to input terminal S of stage N, as shown in line A of Fig. 8. This causes the potential at output terminal $O_1$ of stage N to rise to +V and the potential at output terminal $O_2$ of this stage to drop to zero, and the trigger circuit of this stage will remain in that condition until a reset or clear pulse is applied to it, as shown in line D of Fig. 8 at time 3. Such a reset pulse is not applied, however, until after desired use has been made of the information stored in the register.

Assume next that it is desired at time 2 to transfer the binary digit "1" stored in stage N of Fig. 7 to the next stage to the right, i.e., to stage N+1. To accomplish this common shift right bus 70 is raised in potential to +V as shown in line I of Fig. 8. Since the other terminal of condenser $C_R$ of stage N is connected to terminal $O_2$ of that stage (which is now at O reference potential), condenser $C_R$ is charged to a value V, as shown in line H of Fig. 8. The waveform shown in line H of Fig. 8 is the potential of the lower terminal of the condenser $C_R$ with respect to its upper terminal.

The source supplying the clear or reset pulses is synchronized with those providing shift right and shift left pulses so that a reset pulse is produced at a time interval "*t*" after a shift pulse is applied to either of these shift buses 70 or 72 (Fig. 7). While not shown, these sources may be pulse generators gated in known manner to produce output pulses only at desired times. As pointed out previously and shown in line D of Fig. 8, this reset pulse occurs at time 3 and resets trigger circuit 50 of stage N so that output $O_1$ is again at zero potential and output $O_2$ is again at a potential of +V (lines B and C, respectively).

When the shift right pulse terminates at time 4, the potential of both the upper and lower terminals of condenser $C_R$ of stage N (Fig. 7) are dropped by a value V. Since a charge equal in magnitude to "V" has been accumulated upon this condenser as explained above, a negative output pulse (line J of Fig. 8) is produced upon the line leading from condenser $C_R$ of stage N to diode 76 of stage N+1 (Fig. 7) as condenser $C_R$ of stage N discharges across resistor 60 of stage N+1 and the input impedance of input terminal S of the latter stage. This negative pulse, being applied to input terminal S of stage N+1, will trigger the latter to its other condition of operation, with its output terminal $O_1$ at a potenial +V and its output terminal $O_2$ at the reference or source potential, as shown in lines O and P, respectively, of Fig. 8. Stages N and N+1 will then remain in these respective conditions of operation until an input or reset pulse, respectively, is applied thereto.

Assume next that it is desired to shift the information stored in stage N+1 of Fig. 7 back to stage N, i.e., that information is to be shifted to the left. To accomplish this, common shift left bus 72 is now raised in potential to +V at time 5, as shown in line F of Fig. 8. This will raise the potential of the upper terminal of condenser $C_L$ of stage N+1 (Fig. 7) to +V. Since the lower terminal of this condenser is connected to output terminal $O_2$ of stage N+1 through associatetd diode 62, condenser $C_L$ of stage N+1 will be charged negatively to a voltage V as shown in line Q of Fig. 8. At time "t" thereafter (which is time 6 on the time scale) a reset or clear pulse (line D of Fig. 8) is applied to all trigger circuits 50, and this will return trigger circuit 50 of stage N+1 to its other condition of operation as shown in lines O and P of Fig. 8.

At time 7 the shift left pulse terminates, as shown in line F, and condenser $C_L$ of stage N+1 (Fig. 7) then discharges across its load impedance, as shown in line Q of Fig. 8. This produces an output pulse on the line extending to the left and leading to input terminal S of stage N of Fig. 7 through associated diode 74, as shown in line R of Fig. 8. This pulse then switches stage N back to its other condition of operation, as shown in lines B and C of Fig. 8. Stages N and N+1 of Fig. 7 will now remain in these respective conditions of operation until a reset or input pulse, respectively, is applied thereto.

Assume next that it is desired, at time 8, to read out the status of each of the stages of the shifting register of Fig. 7. This is accomplished by raising the potential of read-out bus 68 to +V as shown in line L of Fig. 8. In the manner previously described in connection with condensers $C_R$ and $C_L$, this causes condenser $C_o$ of each stage in which a binary digit "one" has been stored to charge. For the example assumed in connection with the waveforms of Fig. 8, it will be recalled that a binary digit "one" is at present stored only in stage N (see line C). Therefore only condenser $C_o$ of stage N is charged to a potential V, as shown in line K. When the read-out pulse terminates, at time 9, this condenser $C_o$ discharges through the external diode and load impedance (not shown) connected to output line 78 of stage N of Fig. 7 and produces a negative output pulse, whose waveform is shown in line M of Fig. 8. Note that this readout operation has no effect upon the status of the trigger circuit 50 of stage N and hence may be repeated as often as desired.

Assume next that, at time 10, the shifting register of Fig. 7 is to be cleared and operations started afresh. This is accomplished by applying a reset pulse from common clear bus 52 (Fig. 7) to each of the stages. Since stage N+1 previously did not have a binary digit "one" stored therein, there is no change in its operation at this time, as shown in lines O and P of Fig. 8. However, since stage N of Fig. 7 did have a binary digit "one" stored therein, its condition of operation is now reversed as shown in lines B and C of Fig. 8.

Assume now that information is to be entered in parallel to stages N and N+1 of Fig. 7, i.e., that a binary digit "one" is to be entered into each of these stages simultaneously from the respective inputs 54. These input pulses for stages N and N+1 are shown in lines A and N, respectively, of Fig. 8 and switch the condition of operation of the trigger circuits 50 of these two stages as shown in lines B and C, and O and P, respectively, of Fig. 8.

If it is assumed next that the information stored in each of these registers is thereafter to be shifted to the left at time 12, this will be accomplished simultaneously for the two stages by again raising the potential of common shift left bus 72 to +V, as shown in line F of Fig. 8. This causes condensers $C_L$ of both stages N and N+1 to charge to a potential V as shown in lines E and Q, respectively, of Fig. 8. Again, at time "t" thereafter (time 13 on the time scale) a reset pulse will be produced on common clear bus 52 to return each of the trigger circuits 50 of stages N and N+1 to their other condition of operation. At time 14 thereafter, the shift left pulse terminates, as shown in line F, producing an output pulse on the line leading from condenser $C_L$ of stage N+1 to input terminal S of stage N of Fig. 7 simultaneously with an output pulse on the line leading from condenser $C_L$ of stage N to input terminal S of stage N−1. These pulses are shown in lines G and R, respectively, of Fig. 8 and occur simultaneously with the discharging of the respective condensers $C_L$ as shown in lines E and Q. The output pulse shown in line R will then return trigger 50 of stage N to its other condition of operation (see lines B and C) and, while the waveforms for this operation are not shown in Fig. 8, the output pulse on line G will switch trigger circuit 50 of stage N−1 of Fig. 7 to its other condition of operation, i.e., indicating the storage of a binary digit "one."

Note that, as shown in lines S–V of Fig. 8, no pulses have been produced on condenser $C_R$ of stage N+1, the output line leading therefrom to stage N+2, condenser $C_o$ of stage N+1, or output line 78 thereof for the conditions of operation assumed in the above explanation.

Figure 9:
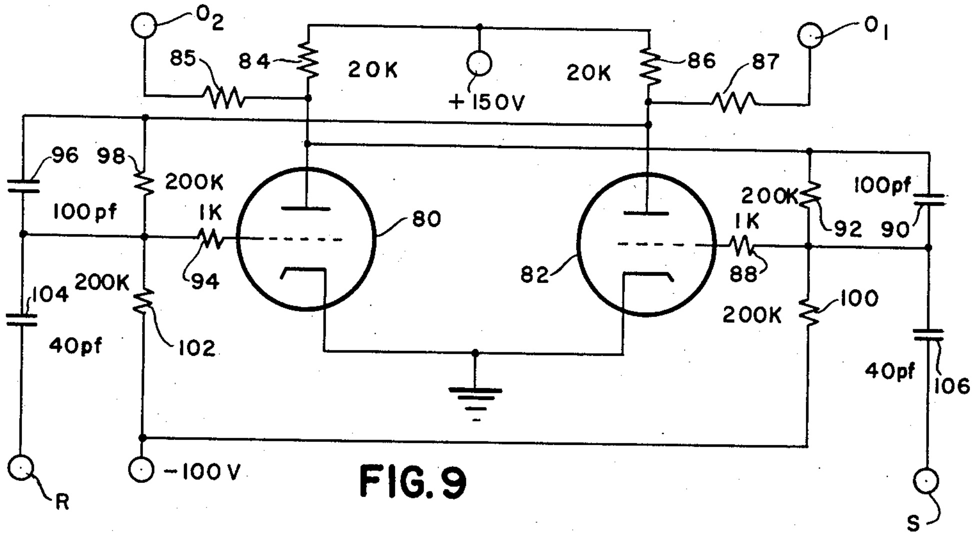
Fig. 9 shows in circuit diagram form a vacuum-tube trigger circuit which may be utilized in the block diagram portions of the circuit of Fig. 7.

As pointed out previously, Fig. 9 is the circuit of a suitable bi-stable trigger circuit of the vacuum-tube type which may be utilized in each of blocks 50 of the shifting register of Fig. 7. It comprises two triodes 80 and 82 which may, for example, comprise the two halves of a type 6J6 or type 5844 dual triode. The cathode of each of these tubes is grounded and its anode or plate is connected to a +150 volt source through a respective plate load resistor 84 or 86. The anode of tube 80 is connected to output terminal $O_2$ through a current limiting resistor 85 and the anode of tube 82 is connected to output terminal $O_1$ through a current limiting resistor 87. The grid of tube 82 is cross-connected to the anode of tube 80 through a series network comprising parasitic suppressor resistor 88, and condenser 90 and resistor 92 connected in parallel. Similarly, the grid of tube 80 is cross-connected to the anode of tube 82 through a similar network comprising parasitic suppressor resistor 94, and condenser 96 and resistor 98 connected in parallel. Resistor 100 is connected between the junction of resistors 88 and 92 and a −100 volt source to bias the grid of tube 82. Similarly, resistor 102 is connected between the junction of resistors 94 and 98 and the same −100 volt source to bias the grid of tube 80. Reset terminal R is connected through condenser 104 to the junction of resistors 94, 98, and 102 and input or "set" terminal S is connected to the junction of resistors 88, 92 and 100 through condenser 106. Suitable values of the circuit parameters for use with the shifting register of Fig. 7 have been indicated on the drawing of Fig. 9, the values of resistance being given in ohms and the values of capacitance being given in micro-micro- or picofarads (pf.).

The operation of this circuit has been described above but will be reviewed here briefly. If the trigger circuit is not already in its reset condition, a negative input pulse applied to reset terminal R will cause tube 80 to switch so that conduction therethrough is at its minimum value, thus increasing the potential at its anode and output terminal $O_2$ from approximately +50 volts to +138 volts. This increase in potential is coupled to the grid of tube 82, primarily through condenser 90 and small resistor 88, and causes tube 82 to switch to its maximum conducting status. The anode of tube 82 and output terminal $O_1$ connected thereto then fall in potential from approximately +138 volts to +50 volts.

In a similar manner a negative input pulse applied thereafter to "set" terminal S will switch the trigger circuit to its other status, i.e., with tube 80 conducting heavily and tube 82 in its minimum state of conduction. Output terminal $O_1$ will then be at approximately +138 volts and output terminal $O_2$ at approximately +50 volts.

With the above values of circuit parameters and voltages, a suitable value of reference voltage for the shifting register circuit of Fig. 7 would be +80 volts, and the read-out, shift left, and shift right buses 68, 70 and 72, respectively, thereof, would normally be at the same potential value. Shift or read-out signals of approximately 50 volts magnitude would then preferably be used to increase each of these buses to approximately +130 volts at the desired times to charge the condensers $C_R$, $C_L$, and $C_o$.

If desired, multiple inputs and/or multiple outputs may be provided to and from each stage of the register. Further, shifting by more than one position or stage, either to the right or left, is of course also possible merely by connecting the shift right or shift left output lines from a particular stage to the reset terminal of the desired stage to the right or left, respectively. If both single- and multiple-stage shift is desired, additional storage condensers would, of course, have to be provided, together with the necessary additional multiple-stage shift bus(es).

Figure 10:
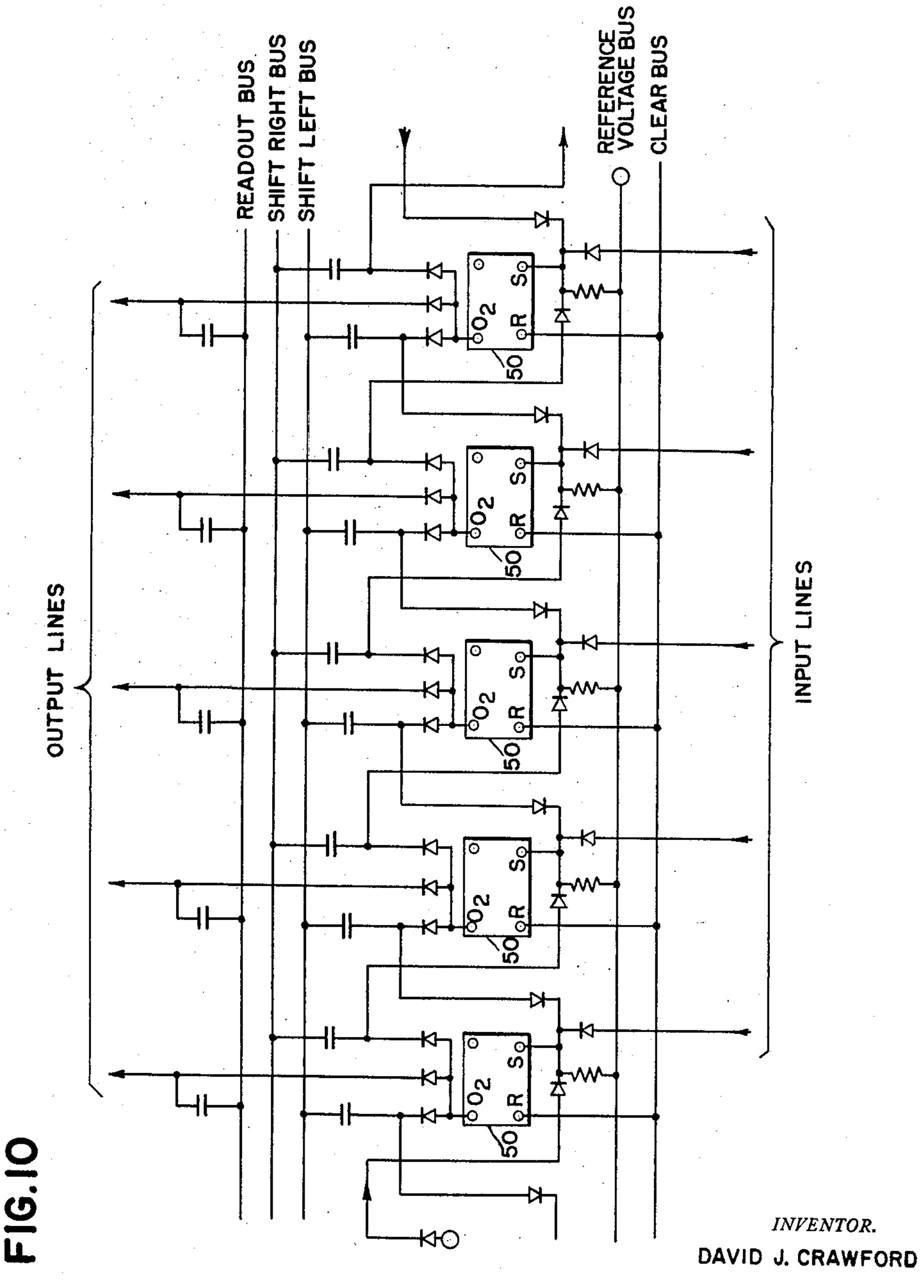
Fig. 10 is a combined circuit and block diagram of the shifting register of Fig. 7 as modified for use with positive input pulses.

While the operation of the shifting register shown in Fig. 7 has been explained in terms of the application of negative input pulses to produce negative output pulses, a shifting register in accordance with this invention is of course not restricted to the use of pulses of negative polarity. If the use of pulses of positive polarity is desired, each of the diodes should be reversed, as shown in Fig. 10, and the trigger circuits then modified to respond to positive input pulses to produce positive output pulses. The polarity of the control pulses on the buses must, of course, then also be reversed, i.e., negative.

Figure 11:
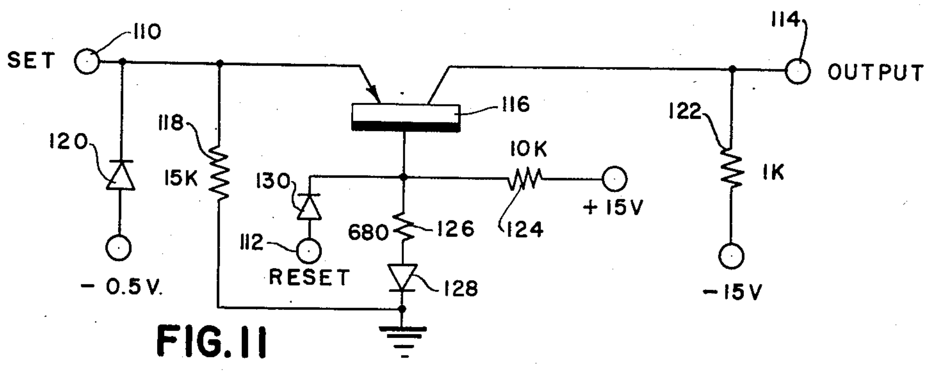
Fig. 11 shows a transistor trigger circuit which may be utilized in the block diagram portions of Fig. 10.

It will also be apparent to those skilled in the art that bi-stable circuits of types other than those including vacuum tubes may be utilized if desired, and in Fig. 11 is shown a bi-stable transistor trigger circuit responsive to positive input pulses and producing positive output pulses, which thus may be utilized in the shifting register shown in Fig. 10. In this case, "set" terminal 110 of Fig. 11 would be connected to input or "set" terminal S of each respective stage of Fig. 10, "reset" terminal 112 of Fig. 11 would be connected to reset terminal R of the same stage of Fig. 10, and output terminal 114 of Fig. 11 would be connected to output terminal $O_2$ of that stage of Fig. 10. Since the operation of the shifting register of Fig. 10 is similar to that of the shifting register of Fig. 7, previously described, except that the input pulses to shift the stages of the register would be positive, the shift or read-out pulses negative and the reference potential level at the higher of the two output voltage levels of the trigger circuit, it is not believed necessary to repeat a detailed explanation of such operation.

Referring again to Fig. 11, transistor 116 is of the point contact type utilizing a body of n-type semiconducting material, e.g., germanium and having a current amplification factor "α" greater than one. The emitter electrode of transistor 116 is directly connected to "set" terminal 110, is connected to ground through resistor 118, and is clamped to an emitter bias potential of −0.5 volts through diode 120 poled as shown in the drawing. Resistor 118 keeps the emitter circuit potential from rising appreciably when the base electrode is pulsed positively with respect to ground. The inclusion of diode 120 in the circuit increases the regeneration and offers other advantages, as set forth in the article entitled "Regenerative Amplifier for Digital Computer Applications" by J. H. Felker appearing at page 1584 of the November 1952 issue of "Proceedings of the I.R.E." However, the use of this diode 120 and resistor 118 is not necessary as pointed out hereinafter.

The collector electrode of transistor 116 is biased from a −15 volt source through load resistor 122, and its base electrode is biased from the junction of resistors 124 and 126, which are connected in series in the order named between a +15 volt source and ground, diode 128 being interposed between resistor 126 and ground and poled so that current normally flows from the +15 volt source to ground through these resistors. The purpose and operation of resistors 124 and 126 are set forth in U.S. Patent No. 2,622,211 granted on December 16, 1952, to R. L. Trent. Reset terminal 112 is connected to the base electrode of transistor 116 through another diode 130 which is poled to pass only positive pulses.

The transistor circuit of Fig. 11 is a regenerative amplifier or bi-stable trigger circuit providing two different voltage levels at its output. When the circuit is in its low conduction state of operation, the potential at the collector electrode and output terminal 114 is at approximately −12.5 volts. When the circuit is in its high conduction state of operation, the collector electrode and output 114 are at a potential of approximately −2.5 volts. The circuit is switched to its low conduction status by applying a positive pulse to the base of transistor 116 through reset terminal 112 and diode 130, and may thereafter be switched to its high conduction status by the application of a positive pulse to the emitter electrode through input or "set" terminal 110. Preferably the reference voltage level of reset terminal 112 is approximately −7.5 volts and the positive reset pulse is of approximately 10 volts magnitude, and the "set" or input pulse (of at least a few tenths of a volt magnitude) supplies approximately 2 ma. to the emitter electrode of transistor 116.

Values of circuit parameters suitable for use in the shifting register of Fig. 10 are indicated on the drawing of Fig. 11.

It should be noted that, with a proper value of source impedance feeding the circuit at terminal 110, if a transistor 116 having a current amplification factor greater than one and suitable characteristics is chosen, elements 118, 120, 124, 126, 128 and 130 may be omitted, as well as the −0.5 and +15 volt sources, and reset terminal 112 then connected directly to the base electrode.

Figure 12:
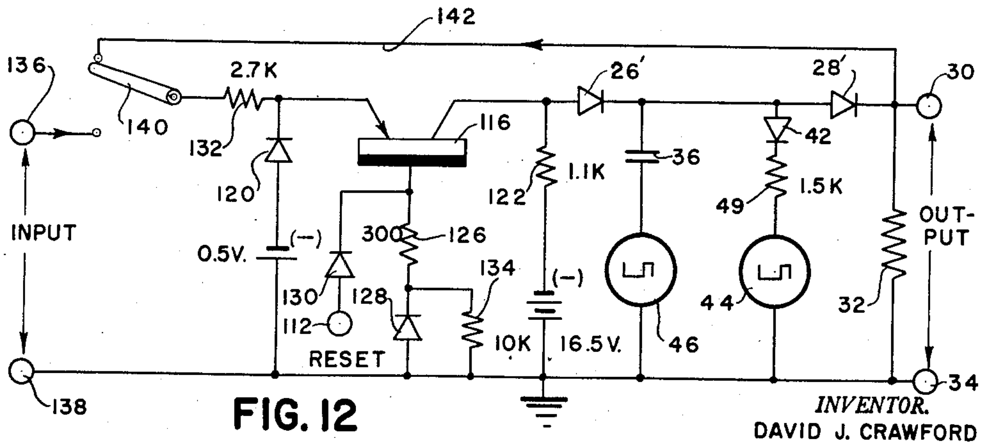
Fig. 12 shows a combined trigger circuit and storage device in accordance with this invention connected to provide regenerative charging of the storage device.

A transistor trigger circuit may also be combined with a storage circuit in accordance with this invention and a feedback line to charge the condenser of the storage regeneratively and thus store information indefinitely, as well as acting as a delay unit. Such a circuit is shown in Fig. 12. The transistor trigger circuit utilized is similar to that shown in Fig. 11 except that a current-limiting resistor 132 is connected in series with the input lead to the emitter electrode of transistor 116 and resistor 118 of Fig. 11 is omitted. Also, the biasing and base impedance arrangement has been modified in that resistor 124 and the +15 volt source of Fig. 11 are omitted and diode 128 has been reversed and is now shunted by a resistance 134.

Suitable values of circuit parameters are given on the drawing of Fig. 12, these values differing slightly from those shown in Fig. 11. Diode 128 now acts as a low impedance when transistor 116 is in its high conduction status but offers a high impedance to reset terminal 112 during the resetting operation so that the source providing the reset pulses is not loaded excessively. Shunting resistor 134 is utilized to discharge any stray capacitance to ground when the reset voltage returns to its reference potential after the trigger circuit has been reset.

The condenser storage circuit utilized is similar to that shown in Figs. 3 and 5 and corresponding elements have been correspondingly numbered.

Input terminals 136 and 138 are provided to the regeneratively charging circuit, and for illustrative purposes switch 140 is shown connecting emitter resistor 132 either to input terminal 136 or to feedback line 142 connected to output terminal 30. Alternatively, switch 140 may be omitted, feedback line 142 then being directly connected to resistor 132 and input terminal 136 connected to this resistor through a suitable isolating element, e.g., another diode.

Assume initially that switch 134 is in its upper position, that a positive input pulse is applied to input terminal 136, that input switch 140 is momentarily connected to input terminal 136 and then switched to feedback line 142, and that the operation of the series network including diode 42, resistor 49, and generator 44 is disregarded.

Figure 13:
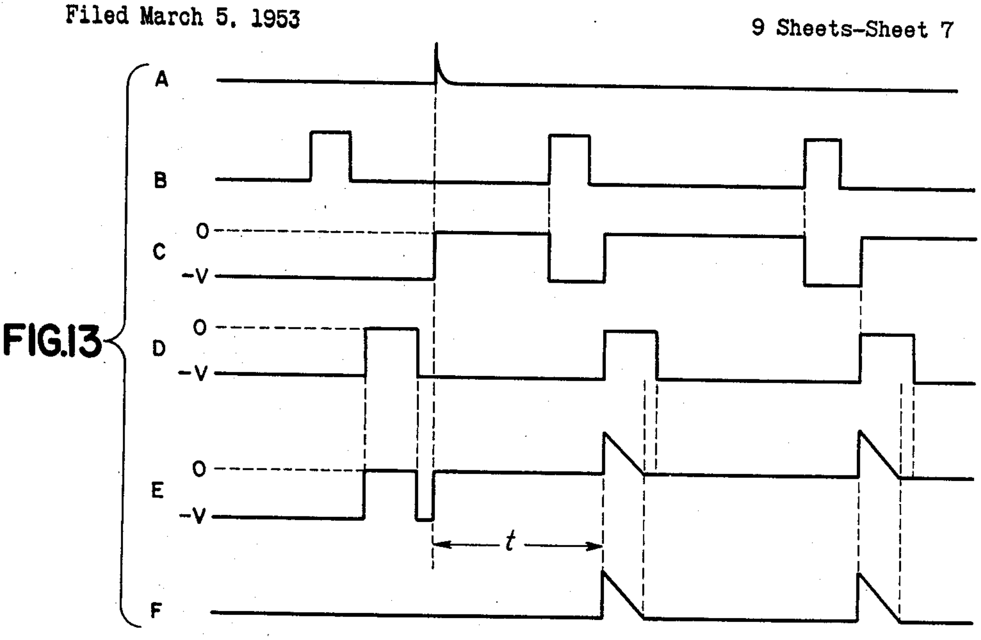
Fig. 13 shows waveforms useful in the explanation of the operation of the regenerative charging storage circuit of Fig. 12.

Referring now to Fig. 13, the application of the positive input pulse (shown in line A) to the emitter of transistor 116 (Fig. 12) switches the trigger circuit to its high conduction status, thus reducing the potential of the collector electrode toward or to zero, as shown in line C, to charge condenser 36 inasmuch as the output reference potential of generator 46 is much more negative at this time (line D). Thereafter when the lower terminal of condenser 36 is raised in potential by the positive pulse output from generator 46, as shown in line D, the potential of the upper terminal of condenser 36 is further raised with respect to output terminal 34 of Fig. 12, as shown in line E of Fig. 13. Condenser 36 then discharges across load resistor 32 and the impedance of any load connected across terminals 30 and 34 and produces a positive output pulse at terminal 30, as shown in line F of Fig. 13, delayed by a finite time "t" after the positive input pulse (line A) which triggered the circuit initially. In the waveform shown in lines E and F it has been assumed that the impedance of resistor 32 (and any load impedance connected across output terminals 30 and 34) is low enough to discharge condenser 36 completely prior to the termination of the output pulse from generator 46.

In cases where the impedance of the discharge path for condenser 36 through load resistor 32, feedback line 142, and any other load connected across terminals 30 and 34 is sufficiently high that condenser 36 does not have enough time to discharge fully during the positive excursion of generator 46, generator 44 with its associated isolating diode 42 and current-limiting resistor 49 may be necessary to eliminate any residual charge. The timing of the operation of generator 44 may be either that described previously in connection with the circuit of Figs. 3 or 5, as pointed out hereinafter.

Reset pulses, shown in line B of Fig. 13, are supplied to reset terminal 112 of Fig. 12 from a source which is not shown but which may be another pulse generator. Note that one of these reset pulses, which are applied to the base of transistor 116, occurred prior to the beginning of the positive output pulse from pulse generator 46 (line D) which discharged charged condenser 36. Thus, the transistor trigger circuit of Fig. 12 is returned to its low conduction status prior to the time the first output pulse shown in line F of Fig. 13 is produced at output terminal 30 of Fig. 12. Since switch 140 is now in its upper position, i.e., connected to feedback line 142, this delayed positive output pulse will be applied to the emitter electrode of transistor 116 to start another cycle by switching the transistor again to its high conduction state and again charging condenser 36, as shown in line E, when the output of pulse generator 46 returns to its reference voltage level, as shown in line D.

Note that the occurrence of the first reset pulse shown in line B of Fig. 13 had no effect on the conduction state of transistor 116 of Fig. 12, as indicated in line C of Fig. 13, inasmuch as this transistor was already in its reset or low conduction state. Similarly, the only effect that the initial output pulse from pulse generator 46 of Fig. 12 shown in line D of Fig. 13 had was to raise and then lower the potential of the upper terminal of condenser 36 (shown in line E), simultaneously with the beginning and end of this output pulse. Condenser 36 did not charge due to the presence of diode 26′ in the circuit, as explained previously.

Pulse generator 46 is preferably synchronized with the source (not shown) providing the reset pulses. This synchronization may conveniently be achieved by means of a synchronizing line. The operation of pulse generator 46 is also synchronized with the operation of pulse generator 44, again by means of a synchronizing line, if the latter generator is utilized in the event that condenser 36 would not otherwise be discharged quickly enough, as described previously, and the timing of the output pulses from pulse generator 44 then may be either that discussed above in connection with Fig. 3 or that discussed above in connection with Fig. 5. If the timing of pulse generator 44 is that discussed in connection with the circuit of Fig. 3, the output of pulse generator 44 of Fig. 12 will be such that each of its output pulses begins shortly after a corresponding output pulse from pulse generator 46 terminates and thus rapidly completes the discharge of condenser 36.

As in Figs. 1, 3 and 5, load impedance 32 may be omitted, if desired, when a load is connected to output terminals 30 and 34 of Fig. 12 or if the input impedance of the trigger circuit is of the proper magnitude when the feedback loop 142 is connected to the trigger circuit input.

There has thus been described a dynamic storage cell or regenerative capacitor storage circuit which works upon a voltage level principle. As such, the actual shape of the waveforms with respect to time is not important insofar as operation is concerned providing that these waveforms reach their levels in the proper sequence. In other words, there is nothing in the operation that depends upon the rate of change of the waveforms.

Figure 14:
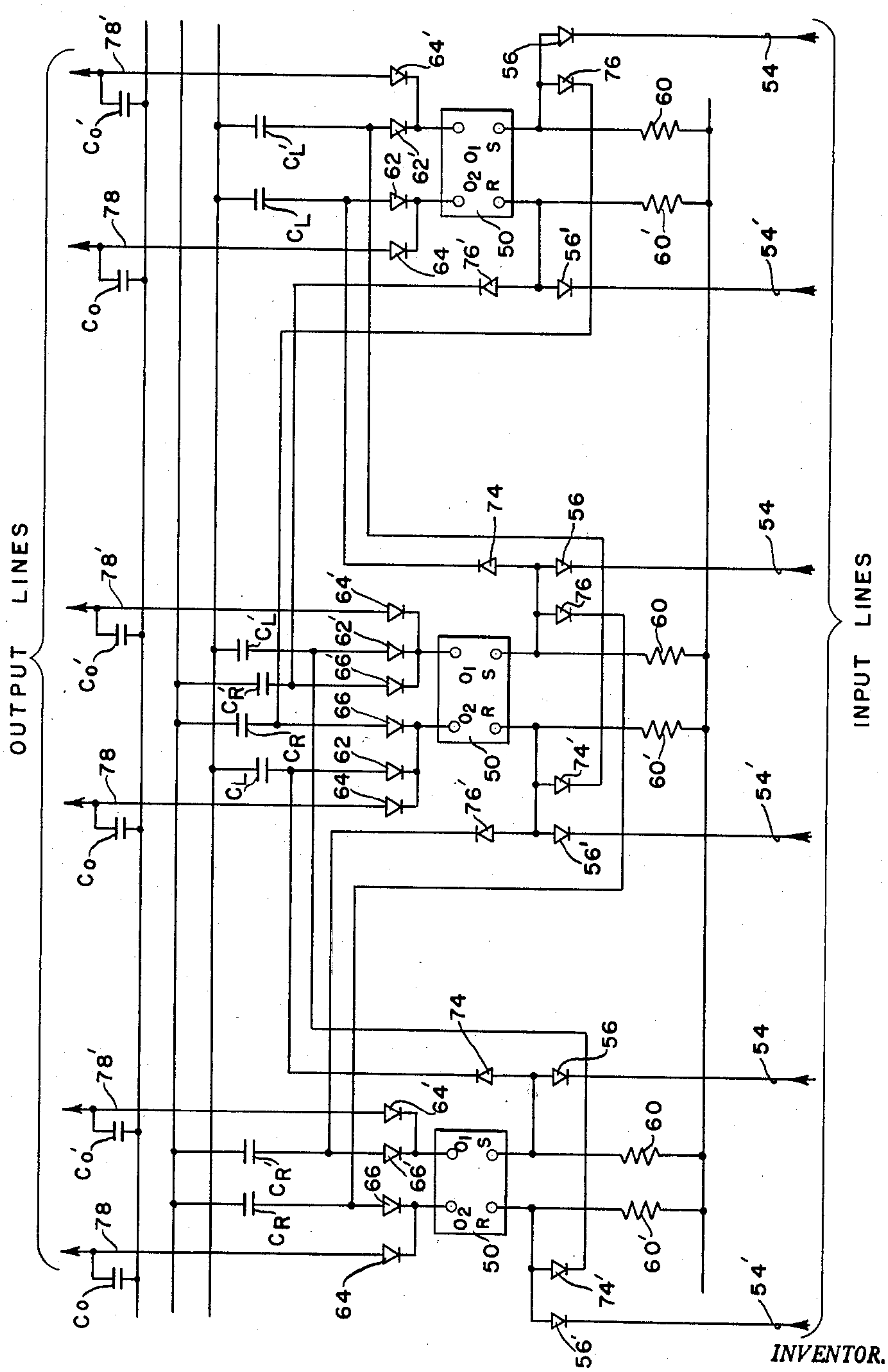
Fig. 14 shows a further three-stage modification of the shifting register of Fig. 7 which does not require a clearing operation or bus.

It will be recalled that in the shifting register circuits shown in Figs. 7 and 10, it was necessary to clear the register whenever information was shifted either to the right or to the left, although clearing was not necessary for a read-out operation. If it is desired to eliminate the time required for this clearing, additional circuitry can be provided. One way of doing this is by making the register double-ended, i.e., providing duplicate storage condenser circuitry connected to output terminal $O_1$ (which it will be recalled was not utilized in the circuit of Fig. 7). Such an arrangement is shown in Fig. 14, which shows three-stages of a shifting register of this type to demonstrate the principle involved. Note particularly that no clear bus is provided or required. The bi-stable vacuum tube trigger circuit shown in Fig. 8 may be utilized for each of the trigger circuits 50 shown in block diagram form in Fig. 14.

The operation of this circuit is similar to that of the shifting register of Fig. 7 described previously in detail and similar components have been correspondingly numbered or lettered. Duplicate added components have been indicated by corresponding but primed reference numerals or letters.

It will be recalled that in the shifting register of Fig. 7, to carry out a shifting operation, the appropriate storage condensers $C_R$, $C_L$ or $C_o$ are first charged up to store the information contained in the various stages of the register. Any condenser connected to output $O_2$ of a trigger circuit 50 in the "one" or high conducting status receives a charge, but a condenser connected to a trigger circuit 50 in the "zero" or low conducting status does not receive a charge. After the condensers are properly charged, all the trigger circuits 50 are then cleared or reset to their "zero" status by a "clear" pulse on bus 52. This is necessary in this particular arrangement because the outputs of the storage circuits are all connected to the "set" input side of their respective trigger circuits 50. In other words, the only function that a storage circuit can perform in this case is to switch the trigger circuit 50 of the next stage to the "one" position from the "zero" position. It is incapable of resetting or switching a trigger circuit 50 from the "one" to the "zero" position; hence the need for the "clear" pulse and bus 52.

In the embodiment shown in Fig. 14, however, a pair of condenser storage circuits is provided for each information-transfer path. Now either "ones" or "zeros" can be transmitted by the condenser storage coupling circuits.

For example, consider a shift left operation in the shifting register shown in Fig. 14. The shift left bus 72 will have positive pulse applied to it to perform this operation. Consider, first, what happens to the appropriate condensers associated with trigger circuit 50 of the middle stage during this operation, namely, condensers $C_L$ and $C_L'$. If this trigger circuit 50 is in its "one" position, the voltage at its left-hand output terminal $O_2$ will be low. As a result, when the shift left bus 72 goes positive, this condenser $C_L$ will receive a charge. The right-hand output terminal $O_1$ of this trigger circuit 50 will be positive for this condition, and therefore its associated condenser $C_L'$ will not receive any charge (providing the shift left bus 72 does not go more positive than the right-hand output terminal $O_1$, a necessary requisite for proper operation of the circuit).

When the shift left bus 72 returns from its positive excursion back to its original or reference potential, the charge stored in this condenser $C_L$ is delivered in the form of a negative pulse at the "set" input terminal S of the trigger circuit 50 of the left-hand stage. If this trigger circuit was in the "zero" condition, the pulse from the condenser $C_L$ of the middle stage will set it to the "one" position. However, if this trigger circuit was already in the "one" position, the pulse from the condenser $C_L$ of the middle stage will have no effect.

In a similar manner, if originally the trigger circuit 50 of the middle stage was in its "zero" position the shift-left pulse would charge up the associated condenser $C_L'$ and not the associated condenser $C_L$. This means that the termination of the shift-left pulse would discharge this condenser $C_L'$ into the "reset" input terminal R of trigger circuit 50 of the left-hand stage. This pulse would cause this trigger circuit to be reset from the "one" to the "zero" position if it was originally in the "one" state, but would have no effect if it was originally in the "zero" position.

The operation for a shift right or read-out operation is similar and hence need not be repeated.

The advantage of the circuit of Fig. 14 over that of the circuit of Fig. 7 is the saving of time involved (at the expense of the additional equipment). In the Fig. 14 shifting register, the minimum time for a shift is the time necessary to charge the storage condensers. In the Fig. 7 register, however, the minimum time for a shift is the time necessary to charge the storage condensers plus the time needed to reset the trigger circuits back to "zero."

Although condenser storage coupling circuits in accordance with this invention inherently introduce a delay (which may, or may not, be desirable), there are sometimes certain logical arrangements whereby delay does not introduce any decrease in the overall speed of an operation. For example, a register may be feeding an associated circuit, such as a logical switching adder circuit, and it is known that at some predetermined future time it is desired to shift the stored information within the register. Once the register receives the information it is going to shift at some future time, the charging of the appropriate condensers to perform the shift may be started by pulsing the appropriate bus, even though the register is still feeding the stored information into the adder circuit. Then, when the instant arrives at which it is desired to perform the actual shifting operation, the shifting bus returns to its original or reference potential, the condensers discharge, and the shift is completed with no loss in time because the condensers had been charged ahead of the time when the actual shifting operation had to occur.

Figure 15:
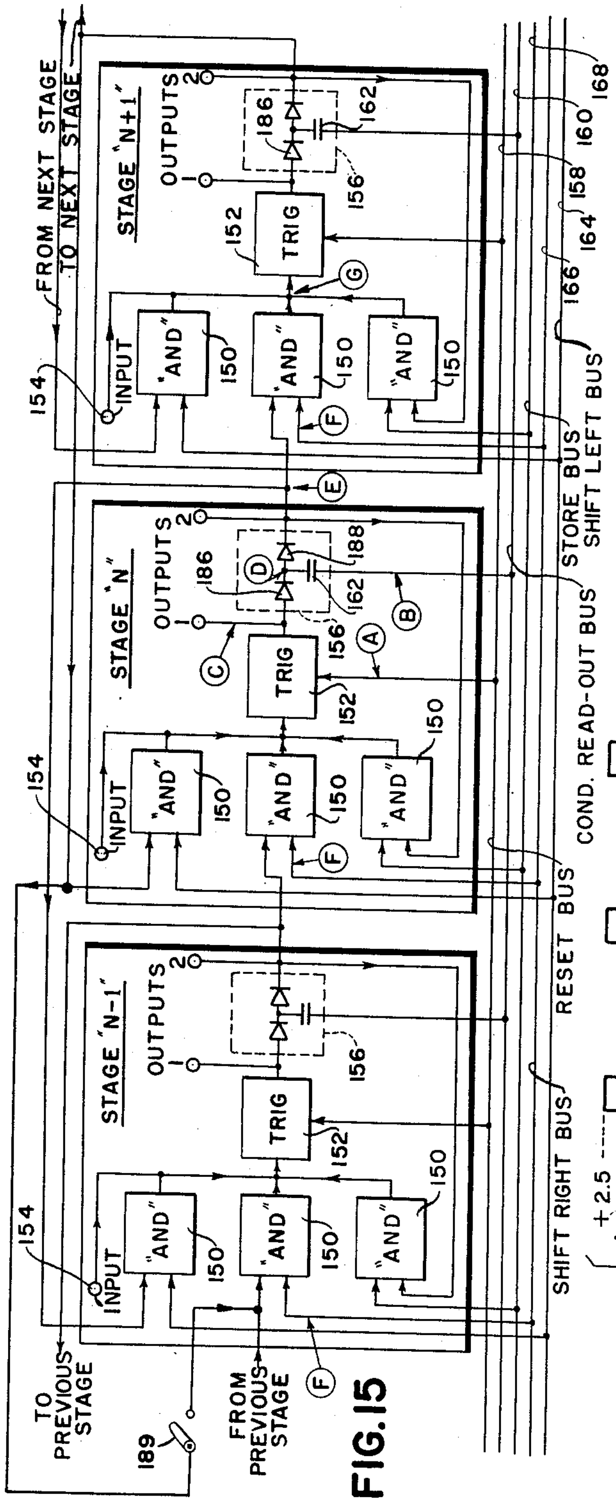
Fig. 15 shows, again in combined circuit and block diagram form, another three-stage shifting register in accordance with this invention.

Fig. 15 shows in combined block and circuit diagram form another embodiment of a shifting register in accordance with this invention. It comprises three similar stages labeled, going from left to right, "N–1," "N," and "N+1." Each of these stages includes three "And," gate or coincidence circuits 150 having their outputs connected together and to the input of a bi-stable trigger circuit 152. An input terminal 154 is also provided for and connected to the input of each trigger circuit 152 in order that an external pulse may be applied to store a digit in that stage. The output of each trigger circuit 152 is connected to a first output terminal labeled "Output 1" and also to the input of a capacitor storage circuit 156 in accordance with this invention. The output of each storage circuit 156 is connected to a second output terminal labeled "Output 2," to the upper "And" circuit 150 of the previous stage, to the middle "And" circuit 150 of the successive stage, and to the lower "And" circuit 150 of its own stage. A reset bus 158, normally at —7.5 volts, is connected to each of the trigger circuits 152 in order to switch all of the trigger circuits simultaneously to their reset condition when desired. A condenser read-out bus 160, normally at —15 volts, is connected to the lower terminal of condenser 162 of each storage circuit 156. A shift left bus 164 is connected to the second input of the upper "And" circuit 150 of each stage, a shift right bus 166 is connected to the second input of the middle "And" circuit 150 of each stage, and a store bus 168 is connected to the second input of the lower "And" circuit 150 of each stage. These buses are normally maintained at —0.5 volts. Whenever a positive gate pulse, preferably of several volts magnitude, is applied to any one of these buses, the respective gate or "And" circuits 150 to which that bus is connected are conditioned to produce an output if the other input of that "And" circuit is simultaneously provided with a positive pulse.

The transistor trigger circuit shown in Fig. 11 may be utilized as the bi-stable trigger circuit required in each of the stages in the shifting register of Fig. 15. Referring, for example, to stage N, the output from the three "And" circuits 150 would then be connected to set terminal 110 of Fig. 11, reset bus 158 would be connected to reset terminal 112 of Fig. 11, and output terminal 114 of Fig. 11 would be connected to the respective "Output 1" terminal and the input of the respective storage circuit 156 of Fig. 15.

Figure 16:
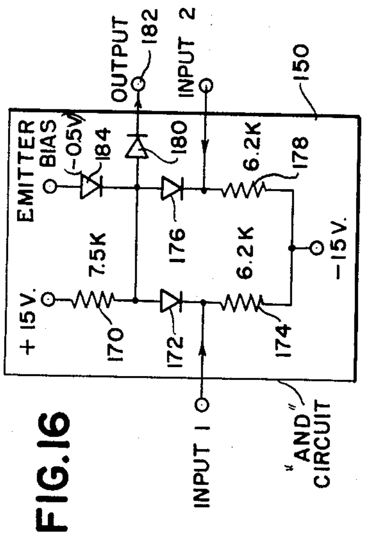
Fig. 16 shows in detail a suitable "AND" circuit of the type shown in block diagram form in Fig. 15.

A suitable "And" or coincidence circuit which may be utilized in the shifting register of Fig. 15 is shown in Fig. 16. This circuit comprises a diode-resistor network. Resistor 170, diode 172, and resistor 174 are connected in series in the order named between a +15 volt source and a —15 volt source. The input labeled "Input 1" of the "And" circuit is connected to the junction of diode 172 and resistor 174. A second diode 176 and another resistor 178 are connected in parallel with the series combination of diode 172 and resistor 174 as shown, and the second input to the "And" circuit, labeled "Input 2," is connected to the junction of this diode 176 and resistor 178. Diodes 172 and 176 are poled such that current can normally flow in the forward direction therethrough from the positive source to the negative source of potential. The junction of diodes 172 and 176 and resistor 170 is connected through a third diode 180 to output terminal 182, which is connected to the input of the respective trigger circuit 152 in Fig. 15 (set terminal 110 of Fig. 11). Diode 180 is similarly poled so that current may normally flow in the forward direction from the +15 volt potential source through resistor 170 to the emitter electrode of the respective transistor 116 (Fig. 11). This junction of the diodes and resistor 170 is clamped to the value of emitter bias for the transistor (in this case —0.5 volts) through a fourth diode 184. An output, in the form of a positive pulse, is produced at output terminal 182 only in response to simultaneous positive pulses applied to inputs 1 and 2.

Values of resistance suitable for use with the circuit parameters shown in the transistor trigger circuit of Fig. 11 are indicated on the drawing of Fig. 16.

Since the output of each capacitor storage circuit 156 of Fig. 15 is connected to the inputs of three "And" circuits 150 in parallel, for the circuit values shown in Fig. 16 the effective load impedance which each capacitor storage circuit 156 drives is approximately 2,000 ohms. This load impedance is returned to —15 volts and clamped by means of diode 184 so that its potential cannot fall below −0.5 volts, as indicated in Fig. 16. If the upper terminal of any condenser 162 is initially at −12.5 volts, that condenser will charge to match the voltage of the input signal to that storage circuit 156 providing that this input is more positive. As pointed out previously, because of the presence of diode 186 in each storage circuit 156, once the condenser is charged the input may be made more negative than the potential at the junction of diode 186 and condenser 162 without reducing the charge on this condenser.

As pointed out above, the transistor trigger circuit of Fig. 11 (whose circuit parameters are given on the drawing) maintains its collector electrode at about −2.5 volts in its high conduction state and at about −12.5 volts in its low conduction state. Switching this circuit to its high conduction state, which may be considered as storing therein a binary digit "one," is accomplished by the application of a positive signal to its emitter electrode. This signal may come from any one of the "And" circuits 150 (Fig. 15) connected to that emitter electrode or from the respective input terminal 154 of that stage. As also pointed out above, resetting of the transistor trigger circuit to its low conduction state, representative of the binary digit "0," is accomplished by the application of a positive signal to its base electrode.

The charge stored upon condenser 162 of any stage indicates how positive the input signal to that storage circuit 156 previously became. When it is desired to utilize this information, a condenser read-out pulse is applied to the lower terminal of the condenser 162 from common condenser read-out bus 168. It will be recalled that this pulse is applied to all condensers 162 of Fig. 15 simultaneously. With the values of circuit parameters shown in Figs. 11 and 16, this pulse is preferably of 12 volts magnitude and is positive, starting from a −12.5 volt reference voltage level.

Raising the lower terminal of condenser 162 by 12 volts will correspondingly raise the potential of its upper terminal. Thus, the upper terminal of any condenser 162 which had not been charged will merely be raised to −0.5 volts with respect to ground. On the other hand, the upper terminal of any condenser which had been charged will rise to approximately +9.5 volts inasmuch as the upper terminal of any charged condenser 162 was initially at the voltage level of the preceding transistor collector electrode in its high conduction state, i.e., −2.5 volts. Since the load is clamped so that it cannot fall below −0.5 volts, only those portions of the voltage at the upper terminal of condenser 162 which rise above −0.5 volts will pass through diode 188 and appear at the output of the condenser storage circuit.

Note again that the condenser storage circuit thus both stores information and changes the D.C. level of the information from input to output. Also, if the input of the condenser storage circuit is of high impedance and thus charges the condenser slowly at a low rate of current flow whereas the output is of low impedance and discharges the condenser rapidly at a high rate of current flow, "current amplification" is provided by the circuit.

Figure 17:
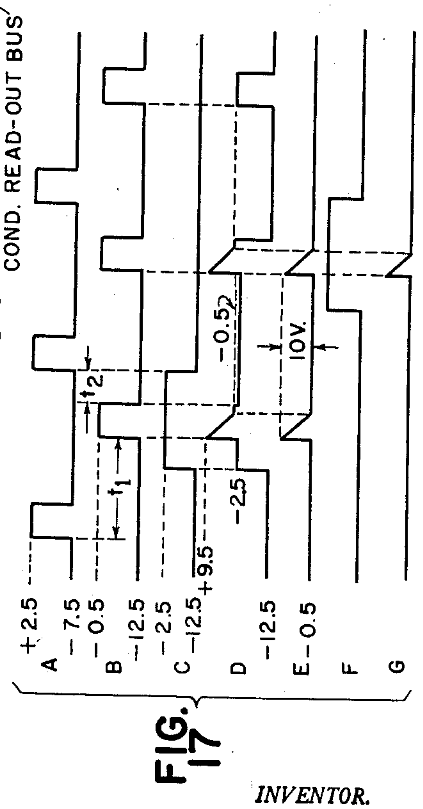
Fig. 17 shows waveforms useful in the explanation of the operation of the shifting register of Fig. 15.

The waveforms shown in Fig. 17 are typical of those for the operation of each stage of the shifting register of Fig. 15. Referring, for example, to stage N, the points of the circuit at which the waveforms of Fig. 17 appear are indicated by corresponding and encircled letters.

The reset pulses for the trigger circuits 152, shown in line A of Fig. 17, are of 10 volts magnitude and extend upward from a reference voltage level of −7.5 volts. The read-out pulses for the condenser storage circuits 156 (which also "reset" any charged condenser to its discharged condition during the reading out operation) are shown in line B of Fig. 17. Each is of 12 volts magnitude rising from a reference voltage level of −12.5 volts and each occurs at a time $t_1$ after a corresponding reset pulse of line A. These pulses may conveniently be obtained from pulse generators (not shown) whose operation is synchronized, as by means of a synchronizing line.

Assume initially that stage N of the shifting register of Fig. 15 is in its low conduction stage, i.e., that a binary digit "zero" is stored in this stage. The voltage level of the output of its trigger circuit 152 is thus at −12.5 volts as shown in line C of Fig. 17. Assume next that a binary digit "one" is stored in this stage at some time between the termination of the first reset pulse shown in line A of Fig. 17 and the beginning of the first read-out pulse shown in line B of Fig. 17. This binary digit may be applied externally to input terminal 154 of stage N (Fig. 15). The output of trigger circuit 152 of this stage then rises to −2.5 volts, as shown in line C of Fig. 17, and charges condenser 162 of stage N (Fig. 15). The potential of the upper terminal of this condenser 162 will thus rise from −12.5 volts to −2.5 volts as shown in line D of Fig. 17. When the first read-out pulse shown in line B occurs, the potential of the upper terminal of condenser 162 of stage N (Fig. 15) will further rise by the amount of the read-out pulse, i.e., from −2.5 volts to +9.5 volts. Similarly, the output potential of condenser storage circuit 156 of stage N (Fig. 15) shown in line E of Fig. 17 and which is normally clamped at −0.5 volts, will simultaneously rise to a value of +9.5 volts.

It is assumed that the 2000 ohm effective output impedance of each of the condenser storage circuits 156 of Fig. 15 is sufficiently low to discharge the condenser 162 thereof completely prior to the termination of the read-out pulse (line B of Fig. 17) producing the discharge. Thus, the potential at the upper terminal of condenser 162 of stage N of Fig. 15 drops to −0.5 volts as the condenser discharges and then remains at this value, as shown in line D of Fig. 17, until the read-out pulse terminates (line B). At this time the waveform of line D drops to −2.5 volts and the condenser 162 of stage N recharges since the output of the preceding trigger circuit 152 is still at −2.5 volts. The waveform of line D then stays at this potential level, due to the presence of diode 186 in condenser storage circuit 156 of stage N (Fig. 15), even after the preceding trigger circuit is reset and its output again drops to −12.5 volts (line C of Fig. 17). When the next read-out pulse occurs (line B), the potential of the upper terminal of the condenser 162 again rises (line D) and discharges the condenser to produce a second output pulse at the output of the condenser storage circuit 156 of stage N (line E). However, since the output of the preceding trigger circuit 152 is now at its lower voltage level, the waveform of line D returns to a potential of −12.5 volts when the second read-out pulse shown in line B terminates and the condenser 162 is not recharged.

Assume next, for example, that it is desired to shift the digit stored in stage N to the next stage to the right, i. e., to stage "N+1" of Fig. 15. This is accomplished by conditioning the middle "And" circuit 150 of stage N+1 simultaneously with the occurrence of the second output pulse from stage N shown in line E of Fig. 17. Note, however, that this conditioning may be initiated either simultaneously with the beginning of this second pulse output shown in line E or at some time prior thereto and after the first pulse output. It is only necessary that they overlap.

It will be recalled that this and the other middle "And" circuits 150 of the shifting register of Fig. 15 are conditioned simultaneously by a shift pulse from the shift right bus 166. In other words, the shift right pulse shown in line F of Fig. 17, is applied simultaneously to the middle "And" circuits 150 of stages N and N+1 (as well as to the middle "And" circuit 150 of stage N−1). However, since it will be assumed that there is no input applied to the middle "And" circuit of stage N from the previous stage N−1, an output will be produced only from the middle "And" circuit 150 of stage N+1 (Fig. 15). This output is shown in line G of Fig. 17 and will switch trigger circuit 152 of stage N+1 to its high conduction stage.

The operation of each stage of the shifting register of Fig. 15 is similar when it is desired to shift the information stored in a stage to the left or to recirculate it within the stage. The only difference is that when a shift left is desired, the potential of shift left bus 164 must be raised simultaneously with the proper read-out pulse from condenser read-out bus 160, and when a recirculation of the information is desired, the potential of store bus 168 must be raised simultaneously with the proper read-out pulse on condenser read-out bus 160. If regularly-repeated reset and read-out pulses as shown in lines A and B, respectively, of Fig. 17 are applied to the shifting register of Fig. 15, the potential on store bus 168 is arranged to be at its higher or pulsed level continuously except when a shift or a clearing of the register is desired. This operation causes a continuous recirculation of the information within each stage and provides a regenerative charging of the condenser 162 thereof.

The relative timing of the various input and control pulses given in connection with the explanation of the operation of the shifting register of Fig. 15 was, of course, purely illustrative and other timings may be utilized if desired within the scope of this invention. The same is true of the previous explanation given in connection with the other shifting registers.

In the event that no shifting or recirculation of the stored information is desired, i.e., the shifting register is merely to be cleared, either with or without a reading out of the information stored therein, none of buses 164, 166 or 168 need be energized at the time that condenser read-out bus 160 is energized. The outputs at each of the "Output 2" terminals (see line E of Fig. 17) is then available, however, as an indication of whether or not a binary digit "zero" or "one" had been stored in a particular stage.

It should also be recalled at this point that "Output 1" of each stage of Fig. 15 is available to indicate the conduction condition of each trigger circuit 152 at any particular time and thus at least until the trigger circuit is reset, is also an indication of whether or not a binary digit "zero" or "one" was stored in a particular stage.

The desired raised potentials or pulses appearing on buses 158, 160, 164, 166 and 168 may be derived from pulse generators (not shown) in known manner. If the pulse generators are of the type which produce regularly recurring pulses, their outputs may be gated, also in known manner, if desired to produce one or more control pulses for application to the buses at the proper times. Preferably the operation of these pulse generators is synchronized, as by means of a synchronizing line.

If desired, the shifting register of Fig. 15 may be connected in ring fashion, i.e., by connecting stage N+1 to stage N−1, as by closing switch 189. Such operation is sometimes desirable in order to retain digits which would otherwise be shifted out at one end of the register during the shifting process by entering them into the other end of the register as they leave. Such operation is commonly referred to as "end-around carry."

Further, the shifting register of Fig. 15 may be employed as a commutator, either with or without the ring connection referred to above. For example, if shift right bus 166 were continuously energized and an input pulse introduced at any arbitrary time into stage N−1 by means of its input terminal 154, this pulse would then produce successive output pulses at the "Output 1" (and "Output 2") terminals of successive stages as the reset and read-out pulses were successively applied to all the stages simultaneously. A similar operation in the opposite direction could be achieved by continuously energizing shift left bus 164 and applying the initial pulse to input terminal 154 of stage N+1.

It will also be apparent to those skilled in the art that similar operation of the previously described shifting registers in accordance with this invention may be achieved and utilized as desired.

Further, while the foregoing descriptions of the operation of shifting registers in accordance with this invention have been made general for a single input pulse inserted at a random time, it will be apparent to those skilled in the art that usually the input(s) will be obtained from a source or sources whose operation is synchronized with the operation of the pulse generators supplying the various control buses.

Also, in the illustrative circuits described, a condenser has been shown as the energy storage element and a resistance has been shown as the load that was used to discharge the condenser. However, alternatively an inductance, an inductance in series with a condenser, a delay line of either the distributed parameter or the lumped-constant variety, or other forms of energy storage circuits containing reactive elements, plus non-linear elements such as diodes to give proper damping or charging characteristics, if desired, may be employed as the energy storage element.

Figure 18:
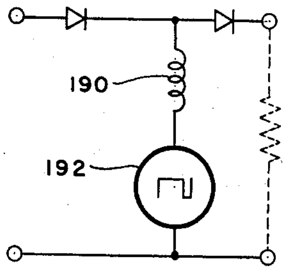
Figs. 18 and 19 show modifications of the storage circuit of this invention employing an inductance and a delay line, respectively, as the energy storage element; and, Fig. 20 shows a storage circuit in accordance with this invention employing a condenser as the energy storage element and an inductance shunted by a diode as the load impedance.

An energy storage circuit in accordance with this invention and employing an inductance 190 as the energy storage element is shown in Fig. 18. Pulse generator 192 of course produces current output pulses rather than voltage output pulses. Since the operation of this circuit is similar to that previously described except that the inductance operates upon current levels, rather than voltage levels, it is believed unnecessary to give a detailed description of the operation of this circuit.

Figure 19:
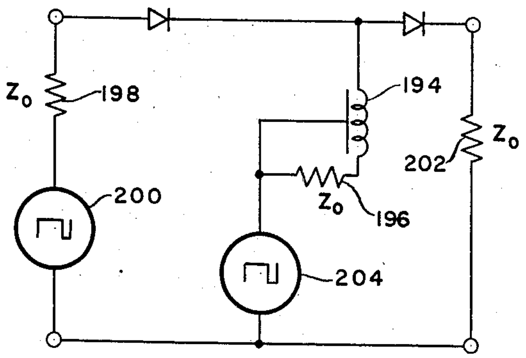

Another enregy storage circuit in accordance with this invetnion is shown in Fig. 19. As its energy storage element it employs a pulse delay network 194, terminating in an impedance 196 of magnitude equal to its characteristic impedance $Z_0$. The input impedance 198 (which may be the internal impedance of the input pulse generator 200 shown only for illustrative purposes) is also equal to $Z_0$, as is the output or load impedance 202. When the driving source in the form of pulse generator 204 produces an output pulse of magnitude V, the potential at the diode junction will change by $V/2$ and remain at this value until the pulse output from generator 204 terminates. During this time interval pulse delay network 194 is charged and remains charged. No delayed pulse is reflected back to the diode junction due to the termination of network 194 in its characteristic impedance $Z_4$. When the pulse output from generator 204 thereafter ends, the energy stored in network 194 will be delivered to output impedance 202, the magnitude of this output being $V/4$.

In the circuit shown in Fig. 19, the voltage level of the input, from pulse generator 200, must remain constant during the operation just described. If this condition cannot be met, impedance 196 may be omitted, thus terminating the pulse delay network 194 in an open circuit. A delayed pulse is then reflected back to the diode junction at a time fixed by the parameters of the pulse delay network and again raises the potential of the diode junction to $V/2$, the pulse network remaining charged. When the pulse output from generator 204 thereafter ends the energy stored in pulse network 194 will again be delivered to output impedance 202. However, now the magnitude of the output will be $V/2$ and its duration twice as long as that in the circuit shown in Fig. 19, which includes impedance 196.

While input impedance 198 and output impedance 202 have been shown and described as being equal in magnitude to the characteristic impedance $Z_0$ of the pulse delay network, this is not required and their value may be adjusted to give any desired mode of operation. The parameters of pulse network 194 should be chosen to give a delay no longer than the time duration of the output pulse from generator 204.

Figure 20:
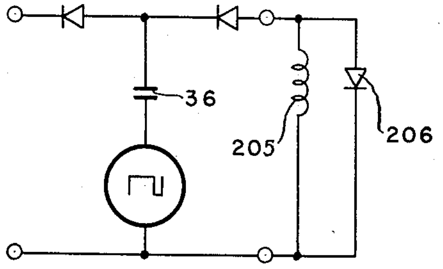

As also mentioned above, the load circuit may comprise something other than a resistance. For example, the load might consist of a pulse forming network of some sort that in combination with the energy-storage element produces the desired shape of pulse at the output. Such a circuit is shown in Fig. 20, wherein condenser 36 is again used as the energy storage element, but now the load comprises inductance 205 shunted by diode 206. If diode 206 is poled properly, an output pulse having an abrupt voltage rise will be produced across inductance 205. This pulse will then fall off at a rate determined by the series resonant frequency of the L–C combination, and diode 206 will absorb the stored energy when the pulse thereafter tries to reverse its polarity.

While there have been shown, described and pointed out the fundamental novel features of the invention as applied to preferred embodiments, it will be understood that various omissions and substitutions and changes in the form and details of the devices illustrated and in their operation may be made by those skilled in the art without departing from the spirit of the invention. It is the intention, therefore, to be limited only as indicated by the scope of the following claims.

What is claimed is:

1. A shifting register comprising a series of stages, each including a bi-stable trigger circuit and a storage device comprising a pair of diodes connected plate-to-cathode and a condenser having two terminals with one connected to the junction of the diodes; the diode pair of each stage being serially connected between the output of the trigger circuit of that stage and the input of the trigger circuit of the next stage of the series; and means for simultaneously varying the voltage level of the other terminal of each of said condensers to shift the information stored in each stage to the next stage of the series.

2. A shifting register in accordance with claim 1 wherein said stages are connected in a closed ring through the respective storage devices.

3. A shifting register in accordance with claim 1 wherein said bi-stable trigger circuit comprises a pair of cross-connected vacuum tubes and said means last-mentioned in claim 1 comprises a voltage pulse generator.

4. A shifting register in accordance with claim 1 wherein said bistable trigger circuit comprises a regenerative transistor amplifier and said means last-mentioned in claim 1 comprises a voltage pulse generator.

5. A shifting register in accordance with claim 1 wherein a second similar storage circuit is provided for each stage but the first and connected between the output of the trigger circuit of that stage and the input of the trigger circuit of the preceding stage, and further means is provided for simultaneously varying the voltage level of the other terminal of the condenser of each of said second storage circuits to shift the information stored in each stage, but the first, to the previous stage.

6. A shifting register in accordance with claim 1 including means for selectively switching each of said trigger circuits to one of its stable states of operation to charge the condenser of the storage device of that stage, and means for thereafter simultaneously resetting all said trigger circuits to the other stable state of operation prior to the operation of the condenser-terminal voltage-level varying means.

7. A shifting register in accordance with claim 1 wherein each of said trigger circuits has first and second outputs providing output pulses of opposite polarities and a first input for switching the circuit to one of its stable states of operation and a second input for switching it to its second stable state of operation, wherein said storage device of each stage is connected between the first output of its trigger circuit and the first input of the trigger circuit of the next stage, wherein a second storage device is provided for each stage and connected between the second output terminal of the trigger circuit of that stage and the second input terminal of the trigger circuit of the next stage, and wherein said means last-mentioned in claim 1 is also connected to the other terminal of the condenser of each of said second storage devices.

8. A shifting register comprising a series of stages, each including a dual-input gate or "And" circuit, a bi-stable trigger circuit having its input connected to the output of said "And" circuit, and a storage device comprising a pair of diodes connected plate-to-cathode and a condenser having two terminals with one connected to the junction of the diodes; the diode pair of each stage being serially connected between the output of the trigger circuit of that stage and one input of the "And" circuit of the next stage; first means for simultaneously varying the voltage level of each of said condensers to discharge any charged condenser into the input of the "AND" circuit to which it is connected; and second means for simultaneously applying a signal to the second input of each of said "And" circuits in coincidence with the operation of said first means to shift the information stored in each stage to the next stage of the series.

9. A shifting register in accordance with claim 8 wherein each stage includes a second dual-input gate or "And" circuit having its output also connected to the input of the trigger circuit of that stage and one of its inputs connected to the output of the storage device of the next successive stage; and wherein third means is provided for simultaneously applying a signal to the second input of each of said second "And" circuits in coincidence with the operation of said first means to shift the information stored in each stage to the preceding stage of the series, said second and third means being selectively operable.

10. A shifting register in accordance wtih claim 8 wherein each stage includes a second dual-input gate or "And" circuit having its output also connected to the input of the trigger circuit of that stage and one of its inputs connected to the output of the storage device of its own stage; and wherein third means is provided for simultaneously applying a signal to the second input of each of said second "And" circuits in coincidence with the operation of said first means, said second and third means being selectively operable, whereby operation of said third means regenerates the charge upon any charged condenser after discharge thereof and recirculates the information stored in any stage within that stage.

11. A shifting register comprising the combination of: a plurality of similar stages each including a bi-stable trigger circuit having a stable triggered condition and a stable reset condition of operation, alternately assumed, first and second "And" circuits having their outputs connected together to the input of said trigger circuit, an output terminal, a pair of diodes serially connected plate-to-cathode between the output of said trigger circuit and said terminal, and a condenser having two terminals with one of its terminals connected to the junction of said diodes and the other of its terminals connected to a point of fixed potential at about the voltage level of the output of said trigger circuit in its reset condition; a connection from the output terminal of each preceding stage to the first "And" circuit of the succeeding stage; a connection from the output terminal of each succeeding stage to the second "And" circuit of the preceding stage; first means for selectively applying input pulses to said trigger circuits to switch respective ones to their triggered condition of operation and charge the associated respective condensers; second means for thereafter resetting all said trigger circuit simultaneously to their reset condition of operation; third means for simultaneously changing the potential of said other terminal of each of said condensers to a voltage level approximately equal to the voltage level of said trigger circuits in their triggered condition of operation to discharge each charged condenser and apply a pulse to those "And" circuits to which the output terminal of the respective stage is connected; and fourth means for simultaneously selectively conditioning either all said first "And" circuits or all said second "And" circuits in coincidence with the operation of said third means to shift the stored charge, if any, of each of said stages to the next stage to the right or to the next stage to the left, respectively.

12. A shifting register comprising the combination of: a plurality of similar stages each including a bi-stable trigger circuit having a stable triggered condition and a stable reset condition of operation, alternately assumed, first, second, and third "And" circuits having their outputs connected together to the input of said trigger circuit, an output terminal, a pair of diodes serially connected plate-to-cathode between the output of said trigger circuit and said terminal, and a condenser having two terminals with one of its terminals connected to the junction of said diodes and the other of its terminals connected to a point of fixed potential at about the voltage level of the output of said trigger circuit in its reset condition; a connection from the output terminal of each preceding stage to the first "And" circuit of the succeeding stage; a connection from the output terminal of each succeeding stage to the second "And" circuit of the preceding stage; and a connection from the output terminal of each stage to the third "And" circuit of that stage; first means for selectively applying input pulses to said trigger circuits to switch respective ones to their triggered condition of operation and charge the associated respective condensers; second means for thereafter resetting all said trigger circuits simultaneously to their reset condition of operation; third means for simultaneously changing the potential of said other terminal of each of said condensers to a voltage level approximately equal to the voltage level of said trigger circuits in their trigered condition of operation to discharge each charged condenser and apply a pulse to those "And" circuits to which the output terminal of the respective stage is connected; and fourth means for simultaneously selectively conditioning either all said first "And" circuits, all said second "And" circuits or all said third "And" circuits in coincidence with the operation of said third means to shift the stored charge, if any, of each of said stages to the next stage to the right, to the next stage to the left, or to recirculate the stored charge, if any, of each stage within that stage, respectively.

13. A shifting register comprising the combination of: a plurality of similar stages connected in a closed ring, each including a bi-stable trigger circuit having a stable triggered condition and a stable reset condition of operation, alternately assumed, first and second "And" circuits having their outputs connected together to the input of said trigger circuit, an output terminal, a pair of diodes serially connected plate-to-cathode between the output of said trigger circuit and said terminal, and a condenser having two terminals with one of its terminals connected to the junction of said diodes and the other of its terminals connected to a point of fixed potential at about the voltage level of the output of said trigger circuit in its reset condition; a connection from the output terminal of each stage to the first "And" circuit of the succeeding stage and to the second "And" circuit of the preceding stage; first means for selectively applying input pulses to said trigger circuits to switch respective ones to their triggered condition of operation and charge the associated respective condensers; second means for thereafter resetting all said trigger circuits simultaneously to their reset condition of operation; third means for simultaneously changing the potential of said other terminal of each of said condensers to a voltage level approximately equal to the voltage level of said trigger circuits in their triggered condition of operation to discharge each charged condenser and apply a pulse to those "And" circuits to which the output terminal of the respective stage is connected; and fourth means for simultaneously selectively conditioning either all said first "And" circuits or all said second "And" circuits in coincidence with the operation of said third means to shift the stored charge, if any, of each of said stages to the next stage to the right or to the next stage to the left, respectively.

14. A storage system comprising a condenser, said condenser being charged to represent a value; and means for regenerating said charge, said means including a bi-stable trigger circuit, a diode and a pulse generator serially connecting said condenser to the output of said trigger circuit with the pulse generator connected between said diode and said condenser, a second diode and a load impedance connected in series and the combination being connected across the combination of said condenser and said pulse generator and a feedback connection from said load impedance to the input of said trigger circuit.

15. A pulse delay storage system comprising a condenser having one terminal coupled to an input providing first and second voltage levels alternately assumed; switching means for connecting the other terminal of said condenser alternatively to voltage sources at said first voltage level and said second voltage level; the coupling between said condenser and input including a diode poled to charge said condenser when said input is at its first voltage level and said other terminal is connected to the voltage source at said second voltage level; and a load impedance and a second diode connected in series and the combination being connected across the combination of said condenser and said switching means with said second diode poled to discharge said condenser, after charging thereof, across said impedance when said switching means is thereafter switched to connect said other terminal to the voltage source at said first voltage level, thereby producing an output pulse.

16. A pulse relay storage system comprising a condenser having one terminal coupled to an input providing first and second voltage levels alternately assumed; switching means for connecting the other terminal of said condenser alternatively to voltage sources at said second voltage level and a third voltage level; the coupling between said condenser and input including a diode poled to charge said condenser when said input is at its first voltage level and said other terminal is connected to the voltage source at said second voltage level; and a load impedance and a second diode connected in series and the combination being connected across the combination of said condenser and said switching means with said second diode poled to discharge said condenser, after charging thereof, across said impedance when said switching means is thereafter switched to connect said other terminal to the voltage source at said third voltage level, thereby producing an output pulse.

17. A pulse delay storage system comprising a condenser having one terminal coupled to an input providing first and second voltage levels alternately assumed; a voltage pulse generator connected to the other terminal of said condenser and having its output reference potential at said first voltage level and its pulse polarity the same as said second voltage level relative to said first voltage level; the coupling between said condenser and input including a diode poled to charge said condenser when said input is at its first voltage level and said generator produces a pulse; and a load impedance and a second diode connected in series and the combination being connected across the combination of said condenser and said pulse generator with said second diode poled to discharge said condenser across said impedance, thereby producing an output pulse beginning with the termination of the pulse from said generator.

18. A pulse delay storage system comprising the combination of: a condenser having one terminal coupled to an input providing first and second voltage levels alternately assumed; a first voltage pulse generator connected to the other terminal of said condenser and having its output reference potential at said first voltage level and its pulse polarity the same as said second voltage level relative to said first voltage level; the coupling between said condenser and input including a diode poled to charge said condenser when said input is at its first voltage level and said first generator produces a pulse; a load impedance and a second diode serially connected across the condenser and pulse generator combination with said second diode poled to discharge said condenser across said impedance, thereby producing an output pulse beginning with the termination of the pulse from said generator; and a third diode and a second pulse generator also serially connected across said condenser and pulse generator combination, the poling of said third diode and the polarity of the output pulse from said second pulse generator being such as to discharge said condenser at the beginning of such output pulse, whereby the duration of the resultant output pulse across said load impedance is determined by the time of inception of the pulse output from said second pulse generator after the time of termination of the pulse output from said first pulse generator.

19. A pulse delay storage system comprising the combination of: a condenser having one terminal coupled to an input providing first and second voltage levels alternately assumed; a first voltage pulse generator connected to the other terminal of said condenser and having its output reference potential at said first voltage level and its pulse polarity the same as said second voltage level relative to said first voltage level; the coupling between said condenser and input including a diode poled to charge said condenser when said input is at its first voltage level and said first generator produces a pulse; a load impedance and a second diode serially connected across the condenser and pulse generator combination with said second diode poled to discharge said condenser across said impedance, thereby producing an output pulse beginning with the termination of the pulse from said generator; and a third diode and a second pulse generator also serially connected across said condenser and pulse generator combination, the poling of said third diode being the same as that of said second diode relative to said condenser, and the polarity of the output pulse from said second pulse generator being the same as that of said first pulse generator, its peak pulse value being at the same voltage level as that of the pulse output from said first pulse generator but its magnitude being approximately twice as great, and its occurrence taking place during the pulse output from said first pulse generator, whereby the pulse output from said second pulse generator substantially completely discharges said condenser only when the input is at its second voltage level simultaneously therewith.

20. A pulse delay storage system in accordance with claim 19 wherein said third diode and second pulse generator are instead serially connected across said condenser, and the magnitude of the output pulse from said second pulse generator is instead approximately equal to the magnitude of the pulse output from said first pulse generator.

21. A pulse delay storage system in accordance with claim 19 wherein a current limiting resistor is connected in series with said second pulse generator and third diode across said condenser and pulse generator combination.

22. A pulse delay storage system in accordance with claim 20 wherein a current limiting resistor is connected in series with said second pulse generator and third diode across said condenser and pulse generator combination.

23. A pulse delay storage system providing a variable delay comprising the combination of: a regenerative transistor amplifier having two stable states of operation alternately assumed, means connected to said amplifier for switching it to the first of its two stable states of operation in response to an input pulse, means for thereafter switching said amplifier to its second stable state of operation in response to a reset pulse, coupling means, a charge storage device connected through said coupling means to the output of said amplifier and adapted to be charged in response to the output voltage level of said amplifier during its operation in said first stable state, said coupling means including means for isolating said storage device from the output of said amplifier during its second stable state of operation to maintain the charge upon said storage device, an output impedance, and switching means for connecting said impedance across said storage device to discharge the latter and produce a delayed pulse at a time determined by the operation of said switching means.

24. A recirculating pulse delay storage system providing a variable delay comprising the combination of: a regenerative transistor amplifier having two stable states of operation alternately assumed; means connected to the input of said amplifier for switching it to the first of its stable states of operation in response to an input pulse; means for thereafter switching said amplifier to its second stable state of operation in response to a reset pulse; coupling means; a condenser connected through said coupling means to the output of said amplifier and adapted to be charged in response to the output voltage level of said amplifier during its operation in said first stable state; said coupling means including means for isolating said condenser from the output of said amplifier during its second stable state of operation to maintain the charge upon said condenser; an output impedance, a pulse generator and additional isolating means serially connected across said condenser to discharge the latter and produce a delayed pulse across said impedance at a time determined by the occurrence of the next output pulse from said pulse generator; and a connection from said output impedance to the input of said amplifier to switch the latter again to its first stable state of operation, whereby said condenser is recharged in response to the delayed pulse.

25. A pulse delay storage system providing a variable delay comprising the combination of: a regenerative transistor amplifier having two stable states of operation alternately assumed; means connected to said amplifier for switching it to the first of its stable states of operation in response to an input pulse; means for thereafter switching said amplifier to its second stable state of operation in response to a reset pulse; coupling means; a condenser connected through said coupling means to the output of said amplifier and adapted to be charged in response to the output voltage level of said amplifier during its operation in said first stable state; said coupling means including means for isolating said condenser from the output of said amplifier during its second stable state of operation to maintain the charge upon said condenser; and an output impedance, a pulse generator and additional isolating means serially connected across said condenser to discharge the latter and produce a delayed pulse across said impedance at a time determined by the occurrence of the next output pulse from said pulse generator.

26. A pulse delay storage system providing a variable delay comprising the combination of: a regenerative transistor amplifier having two stable states of operation alternately assumed; means connected to said amplifier for switching it to the first of its stable states of operation in response to an input pulse; means for thereafter switching said amplifier to its second stable state in response to a reset pulse; a condenser; a diode connecting said condenser to the output of said amplifier and poled to charge said condenser in response to the output voltage level of said amplifier during its operation in said first stable state and isolate said condenser from the output of said amplifier during its second stable state of operation; and an output impedance, a pulse generator and a second diode connected across said condenser with said second diode poled to discharge said condenser and produce a delayed pulse across said impedance at a time determined by the occurrence of the next pulse output from said pulse generator.

27. A pulse delay storage system providing a variable delay comprising the combination of: an energy storage device; a diode connecting said device to an input providing two energy levels alternately assumed and poled to charge said device in response to one energy level of said input and isolate said device from the input when the latter is at its second energy level; and a series network comprising an output impedance, a pulse generator and a second diode connected across said device with said second diode poled to discharge said device and produce a delayed output pulse across said impedance in response to the termination of the pulse output from said pulse generator after said device is charged but produce no output pulse if the storage device is not charged.

28. A storage system comprising the combination of: a first pulse generator providing an output pulse whose peak value is at a voltage level different from the reference voltage level of its output; a charge storage device and a diode serially connected between said pulse generator and an input providing said two different voltage levels, alternately assumed, with said diode poled to charge said device, when said generator produces a pulse output, in response to the voltage level of said input equal to said reference voltage level and isolate said device from the input when the latter is at its other voltage level; and a parallel network connected across said device, said network comprising an output impedance connected in parallel with the series combination of a second pulse generator and a second diode, said second diode being poled to discharge said device and produce a delayed pulse across said impedance starting with the termination of the pulse output from said first pulse generator and ending with the beginning of the pulse output from said second pulse generator after said device is charged.

29. A recirculating pulse delay storage system providing a variable delay comprising the combination of: a regenerative transistor amplifier having two stable states of operation alternately assumed, means connected to the input of said amplifier for switching it to the first of its stable states of operation in response to an input pulse, means for thereafter switching said amplifier to its second stable state of operation in response to a reset pulse, coupling means, a condenser connected through said coupling means to the output of said amplifier and adapted to be charged in response to the output voltage level of said amplifier during its operation in said first stable state, said coupling means including means for isolating said condenser from the output of said amplifier during its second stable state of operation to maintain the charge upon said condenser, an output impedance, switching means for connecting said impedance across said condenser to discharge the latter and produce a delayed pulse at a time determined by the operation of said switching means, and a connection from said output impedance to the input of said amplifier to switch the latter again to its first stable state of operation, whereby said condenser is recharged in response to the delayed pulse.

30. A pulse delay storage system comprising a condenser having one terminal coupled to an input providing first and second voltage levels; means connected to the other terminal of said condenser for varying the voltage level of said other terminal selectively between said first voltage level and said second voltage level; the coupling between said condenser and input including a diode poled to charge said condenser when said input is at its first voltage level and said other terminal is at said second voltage level; and a load impedance and a second diode connected in series and the combination being connected across the combination of said condenser and said means with said second diode poled to discharge said condenser, after charging thereof, across said impedance when said means thereafter selectively varies the voltage level of said other terminal to said first voltage level, thereby producing an output pulse.

References Cited in the file of this patent

UNITED STATES PATENTS

| | | |
|---|---|---|
| 2,131,322 | Higgitt et al. | Sept. 27, 1938 |
| 2,294,863 | Hadfield | Sept. 1, 1942 |
| 2,531,976 | Moore | Nov. 21, 1950 |
| 2,591,406 | Carter | Apr. 1, 1952 |
| 2,629,827 | Eckert et al. | Feb. 24, 1953 |
| 2,644,893 | Gehman | July 7, 1953 |
| 2,649,502 | Odell | Aug. 18, 1953 |
| 2,720,642 | Blakely | Oct. 11, 1955 |

OTHER REFERENCES

Publication: Electrical Engineering, vol. 71, Issue 10, October 1952, pages 916–921.